United States Patent [19]
Hutcheson et al.

[11] Patent Number: 5,465,308
[45] Date of Patent: * Nov. 7, 1995

[54] PATTERN RECOGNITION SYSTEM

[75] Inventors: Timothy L. Hutcheson, Los Gatos; Wilson Or, Santa Clara; Venkatesh Narayanan, Fremont; Subramaniam Mohan, Sunnyvale; Peter G. Wohlmut, Saratoga; Ramanujam Srinivasan, Sunnyvale, all of Calif.; Bobby R. Hunt; Thomas W. Ryan, both of Tucson, Ariz.

[73] Assignee: Datron/Transoc, Inc., Simi Valley, Calif.

[*] Notice: The portion of the term of this patent subsequent to Dec. 28, 2010, has been disclaimed.

[21] Appl. No.: 111,616

[22] Filed: Aug. 25, 1993

Related U.S. Application Data

[62] Division of Ser. No. 920,188, Jul. 23, 1992, Pat. No. 5,274,714, which is a division of Ser. No. 533,113, Jun. 4, 1990, Pat. No. 5,161,204.

[51] Int. Cl.$^6$ .................................................. G06K 9/62
[52] U.S. Cl. .............................. 382/159; 395/21; 395/23; 382/156; 382/190
[58] Field of Search .............................. 382/15, 16, 38, 382/43, 6, 30, 14, 159, 156, 190; 395/21, 22, 23

[56] References Cited

U.S. PATENT DOCUMENTS

| | | | |
|---|---|---|---|
| 3,081,379 | 12/1956 | Lemelson | 178/6.6 |
| 3,993,976 | 11/1976 | Ginsburg | 382/41 |
| 4,100,370 | 7/1978 | Suzuki et al. | 179/1 SB |
| 4,118,730 | 10/1978 | Lemelson | 358/93 |
| 4,148,061 | 4/1979 | Lemelson | 358/101 |
| 4,213,183 | 7/1980 | Barron et al. | 364/507 |
| 4,225,850 | 9/1980 | Chang et al. | 340/146.3 |
| 4,338,626 | 7/1982 | Lemelson | 358/93 |

(List continued on next page.)

OTHER PUBLICATIONS

Goldstein et al., "Man Machine Interaction in Human Face Identification" Bell System Tech Journal, vol. 51, No. 2, Feb. 1972.

"Digital Signal Processor Accelerators For Neural Network Simulations" by P. Andrew Penz & Richard Wiggins, Texas Instruments.

(List continued on next page.)

Primary Examiner—Leo H. Boudreau
Assistant Examiner—Phuoc Tran
Attorney, Agent, or Firm—D'Alessandro & Ritchie

[57] ABSTRACT

A method and apparatus under software control for pattern recognition utilizes a neural network implementation to recognize two dimensional input images which are sufficiently similar to a database of previously stored two dimensional images. Images are first image processed and subjected to a Fourier transform which yields a power spectrum. An in-class to out-of-class study is performed on a typical collection of images in order to determine the most discriminatory regions of the Fourier transform. A feature vector consisting of the highest order (most discriminatory) magnitude information from the power spectrum of the Fourier transform of the image is formed. Feature vectors are input to a neural network having preferably two hidden layers, input dimensionality of the number of elements in the feature vector and output dimensionality of the number of data elements stored in the database. Unique identifier numbers are preferably stored along with the feature vector. Application of a query feature vector to the neural network will result in an output vector. The output vector is subjected to statistical analysis to determine if a sufficiently high confidence level exists to indicate that a successful identification has been made. Where a successful identification has occurred, the unique identifier number may be displayed.

6 Claims, 11 Drawing Sheets

Microfiche Appendix Included
(4 Microfiche, 887 Pages)

U.S. PATENT DOCUMENTS

| | | | |
|---|---|---|---|
| 4,511,918 | 4/1985 | Lemelson | 358/107 |
| 4,593,367 | 6/1986 | Slack et al. | 364/513 |
| 4,653,109 | 3/1987 | Lemelson et al. | 382/34 |
| 4,760,604 | 7/1988 | Cooper et al. | 382/15 |
| 4,764,973 | 8/1988 | O'Hair | 382/14 |
| 4,774,677 | 9/1988 | Buckley | 364/513 |
| 4,783,754 | 11/1988 | Bauck et al. | 364/513.5 |
| 4,803,736 | 2/1989 | Grossberg et al. | 382/22 |
| 4,805,225 | 2/1989 | Clark | 382/15 |
| 4,809,331 | 2/1989 | Holmes | 381/41 |
| 4,817,176 | 3/1989 | Marshall et al. | 382/43 |
| 4,843,631 | 6/1989 | Steinpichler et al. | 382/43 |
| 4,876,731 | 10/1989 | Loris et al. | 382/40 |
| 4,881,270 | 11/1989 | Knecht et al. | 382/17 |
| 4,905,286 | 2/1990 | Sedgwick et al. | 381/43 |
| 4,989,256 | 1/1991 | Buckley | 382/15 |
| 5,161,204 | 11/1992 | Hutcheson et al. | 382/16 |
| 5,274,714 | 12/1993 | Hutcheson et al. | 382/15 |

OTHER PUBLICATIONS

"Neural Networks for Planar Shape Classification", Lalit Gupta and Mohammed R. Sayeh.

"Fast Learning in Artificial Neural Systems: Multilayer Perception Training Using Optimal Estimation", J. F. Shepanski, TRW, Inc., pp. I-465 through I-472, (undated).

"The Recognition of Faces," Leon D. Harmon, Scientific American, pp. 71-82 (undated).

Eighteen Eight Laboratories brochure on the PL800 and PL 1250 Floating Point Array Processor (undated).

"Recognition of human faces from isolated facial features: A developmental study," Alvin G. Goldstein & Edmund J. Mackenberg, Psychon. Sci., vol. 6 (4), pp. 149-150 (1966).

"Processing of Multilevel Pictures by Computer—The Case of Photographs of Human Face," Toshiyuki Sakai & Makoto Nagao, Systms Comp. Contrls (translated from Denshi Tsushia Gakkai Ronbunshi vol. 54-C, No. 6, 445-452, vol. 2, No. 3, pp. 47-54 (1971).

"Identification of Human Faces", A. Jay Goldstein, Leon D. Harmon & Ann B. Lesk, Proceedings of IEEE, vol. 59, No. 5, pp. 748-760 (May, 1971).

"Models for the processing and identification of faces", John L. Bradshaw & Graeme Wallace, Perception & Psychophysics, vol. 9 (5) (1971), pp. 443-448.

"Man-Machine Interaction in Human-face Identification," A. J. Goldstein, L. D. Harmon & A. B. Lesk, The Bell Systm Tech. Jrnl. vol. 51, No. 2, pp. 399-427 (Feb. 1972).

"Automatic Recognition of Human FAce Profiles", Leon D. Harmon & Willard F. Hunt, Computer Graphics & Image Processing 6, pp. 135-156 (1977).

"When Face Recognition Fails," K. E. Patterson & A. D. Baddeley, Jrnl. of Experimental Psychology: Human Learning & Memory, vol. 3, No. 4, pp. 406-417 (1977).

"A Threshold Selection Method from Gray-Level Histograms," Nobuyuki Otsu, IEEE Transactions on Systems, Man & Cybernetics, vol. SMC-9, No. 1 (Jan. 1979).

"Machine Identification of Human Faces", L. D. Harmon, M. K. Khan, Richard/Lasch & P. F. Ramig, Pattern Recognition, vol. 13, No. 2, pp. 97-110 (1981).

"Changing faces: Visual and non-visual coding processes in face recognition," Vicki Bruce, British Journal of Psychology, 73, pp. 105-116 (1982).

"A Computer Vision System for the Identification of Individuals", S. R. Cannon et al., Proc. IECON 1986 Conference, pp. 347-351 (1986).

"'Smart Sensing' in Machine Vision" [Draft], Peter J. Burt, David Sarnoff Research Center, SRI International (Mar. 1987).

"An Introduction to Computing with Neural Nets," Richard P. Lippmann, IEEE ASSP Mag., pp. 4-22 (Apr. 1987).

"Evaluation and Enhancement of the AFIT Autonomous Face Recognition Machine," Thesis by Laurence C. Lambert, Captain, USAF, AFIT/GREENG/87D-35.

"Neural Networks Primer, Part I", Maureen Caudill, AI Expert, pp. 46-52, (Dec. 1987).

"Explorations in Parallel Distributed processing: A Handbook of Models, Programs and Exercises," James L. McClelland & David E. Rumelhart, IT Press (1988).

"Neural Networks Primer, art II" Maureen Caudill, AI Expert, pp. 55-61 (Dec. 1987).

"Neurocomputing: picking the human brain", Robert Hecht-Nielsen, IEEE Spectrum, pp. 36-41 (Mar. 1988).

"Generalization in Layered Classification Neural Networks" Robert J. Marks, II, Les E. Atlas and Seho Oh Proc. IEEE Intl. Symposium on Circuits & Systems, ISDL Report B-88 (Jun., 1988).

"To Identify Motorists, the Eye Scanners Have It", Don Steinberg, PC Week, "Connectivity" (Jun. 28, 1988).

"Image Restoration Using a Neural Network", Yi-tong Zhou, Rama Chellappa, Aseem Vaid & B. Keith Jenkins, IEEE Transactions on Acoustics, Speech, & Signal Processing, vol. 36, No. 7, pp. 1141-1151 (Jul. 1988).

"Complete Discrete 2-D Gabor Transforms by Neural Networks for Image Analysis and Compression," John G. Daugman, IEE Trans. on Acoustics, Speech & Signal Processing, vol. 36, o. 7, pp. 1169-1179 (Jul. 1988).

"The Effect on Stochastic Interconnects In Artificial Neural Network Classification," Robert J. Marks, II, Les E. Atlas, Doug C. Park & Seho Oh, IEEE Intl. Conf. on Neural Neworks, ISDL Rpt. (Jul. 1988).

"Automated Quality and Process Control Based On An Optical Fourier/Electronic Neuro Computer Inspection Systems," David E. Glover, Globe Holonetics Corp., Intl. Neural Network Society, pp. 1-12 (Sep. 1988).

"2-D Invariant Object Recognition Using Distributed Associative Memory," H. Webster, G. L. Zimmerman, IEEE Transactions on Pattern Analysis & Machine Intelligence vol. 10, No. 6, pp. 811-821 (Nov. 1988).

"Technology vs. Terror," Patrick Flanagan, Electronics, pp. 46-51 (Jul. 1989).

"JPL Computer Researchers Develop Hardware for Neural Networks," Breck W. Hendersen, Aviation Week & Space Technology, pp. 129-131 (Oct. 9, 1989).

"Segmentation of Textured Images and Gestalt Organization Using Spatial/Spatial-Frequency Representations", T. R. Reed & H. Wechsler, IEEE Trans. on Pattern Anlysis & Mach. Intelligence, vol. 12, No. 1, pp. 1-12 (Jan. 1990).

"Not now, dear, the TV might see," New York Times (c. Jan. 1990).

"Neural Network Computers Finding Practical Applications at Lockheed," Breck W. Henderson, Aviation Week & Space Technology, pp. 53-55 (Jan. 15, 1990).

"Watch How the Face Fits . . . ," Christine McGourty (c. Mar. 1990).

"Parallel Computers, Neural Networks Likely Areas For Advancement in 1990s", Breck W. Henderson, Aviation Week & Space Technology, pp. 91-95 (Mar. 19, 1990).

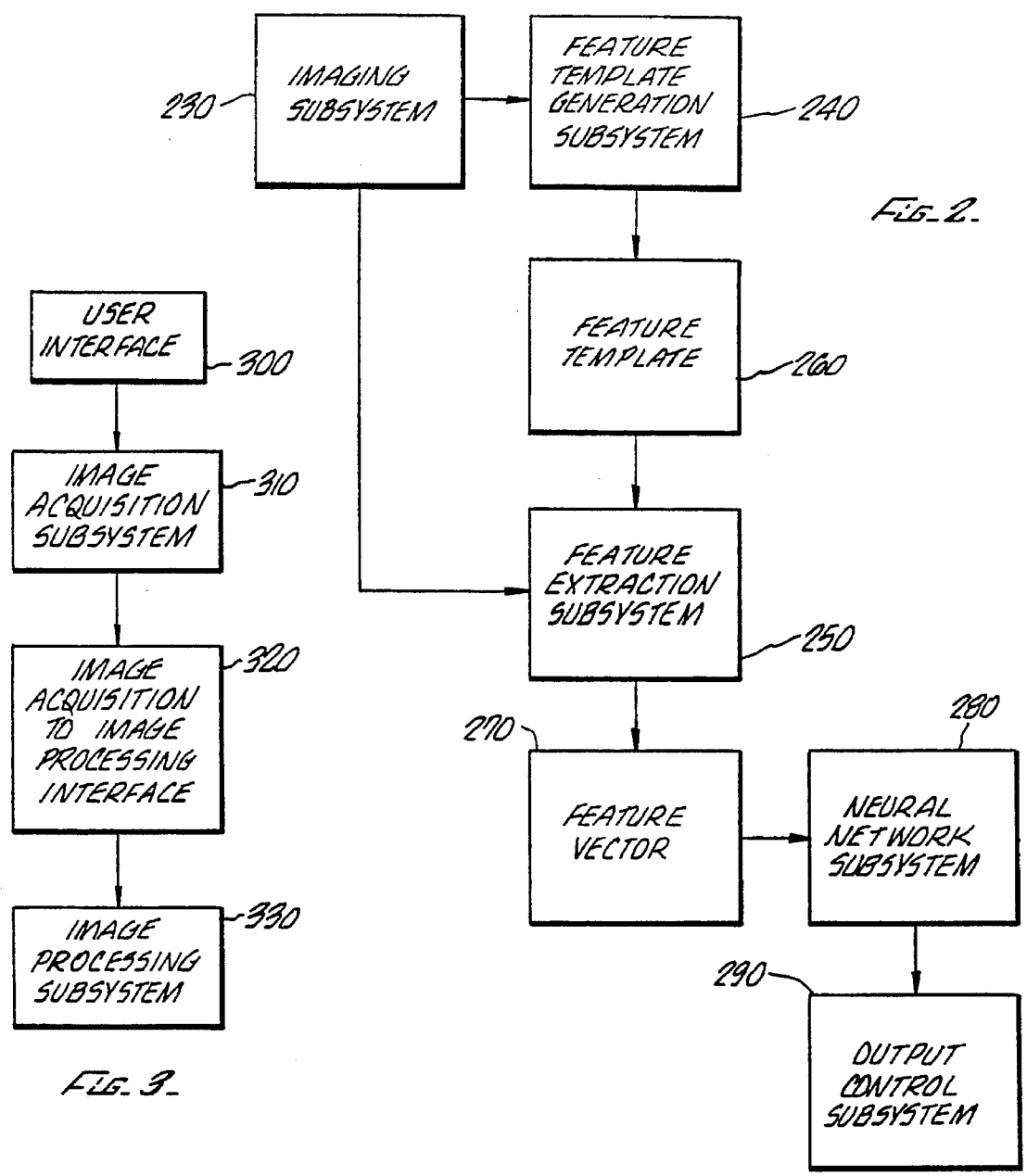
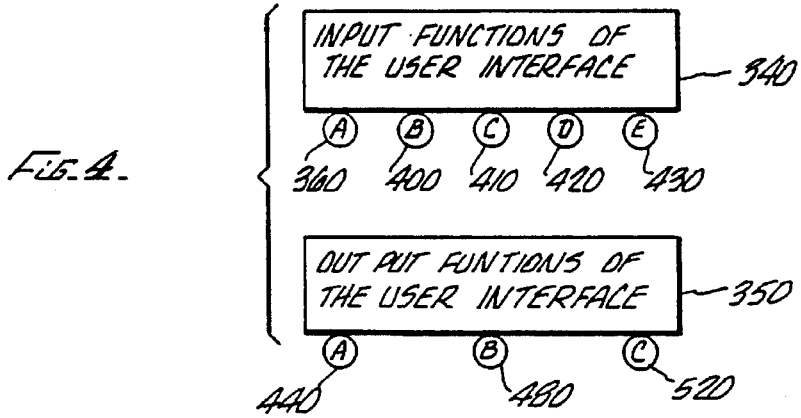

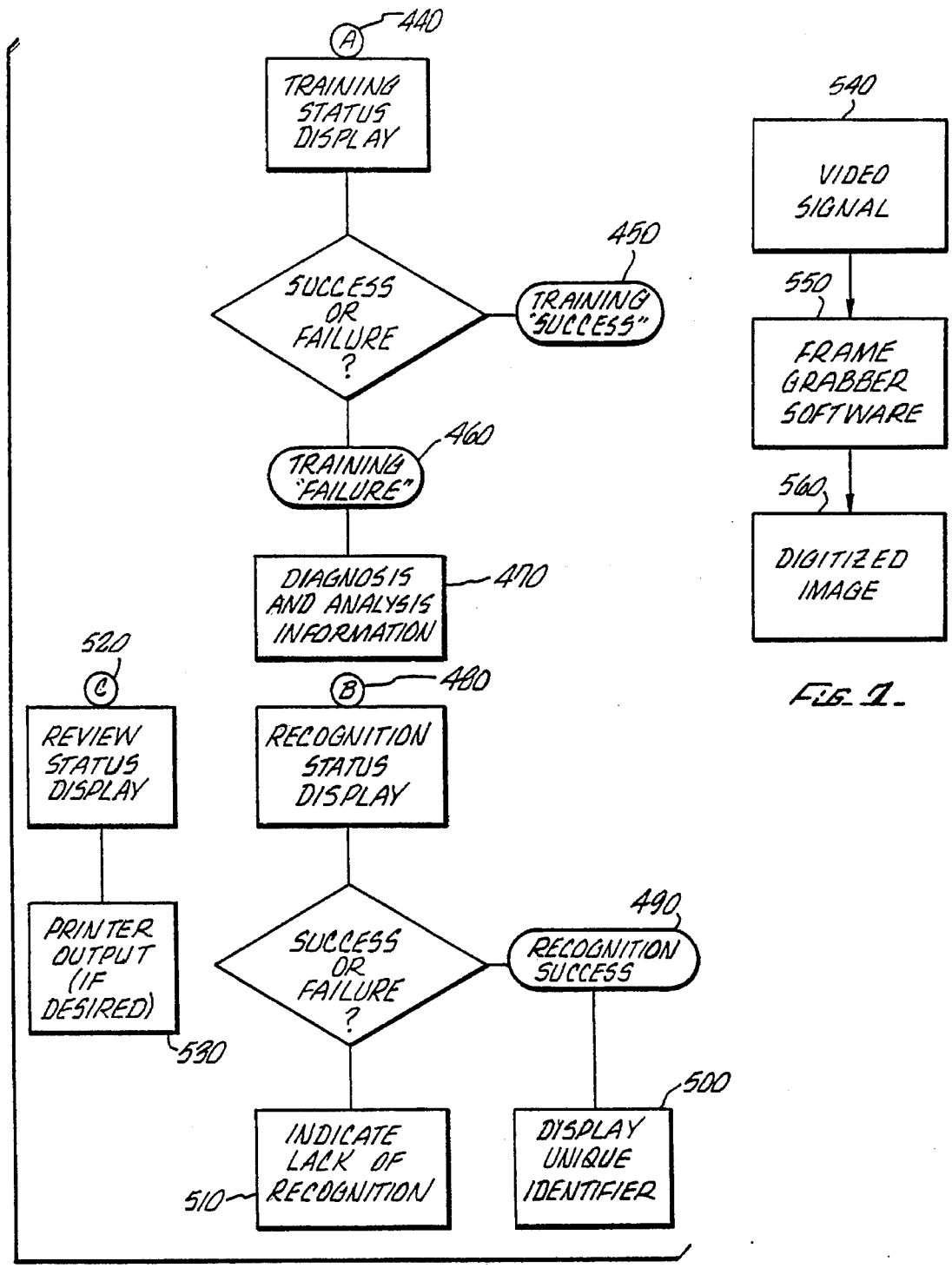

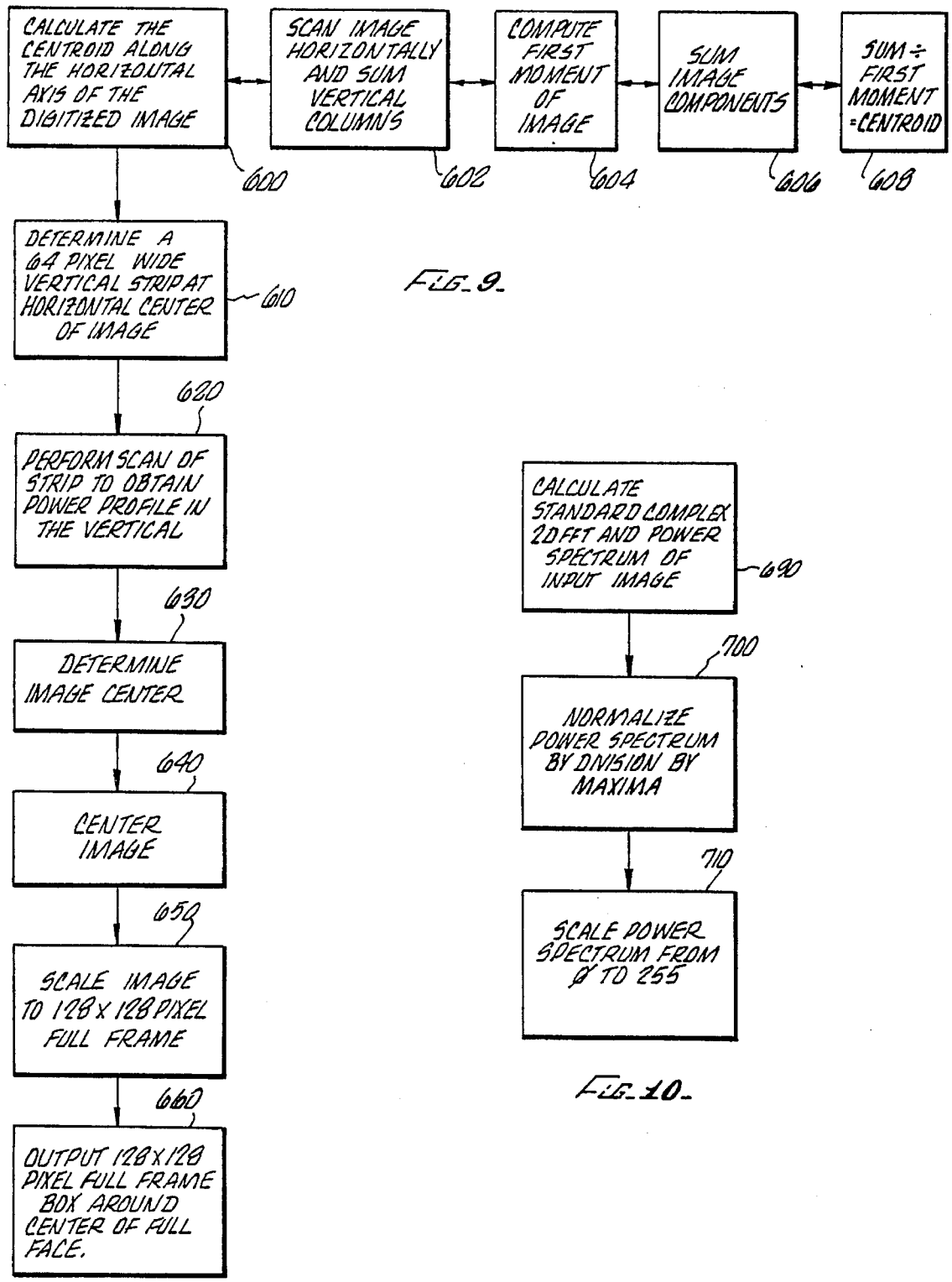

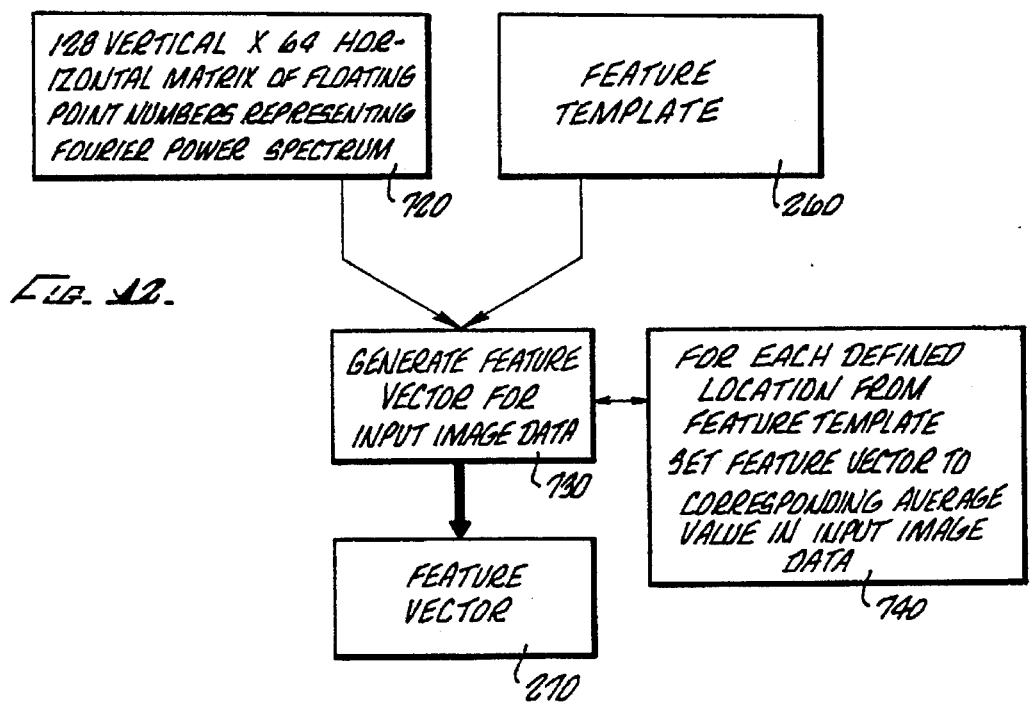
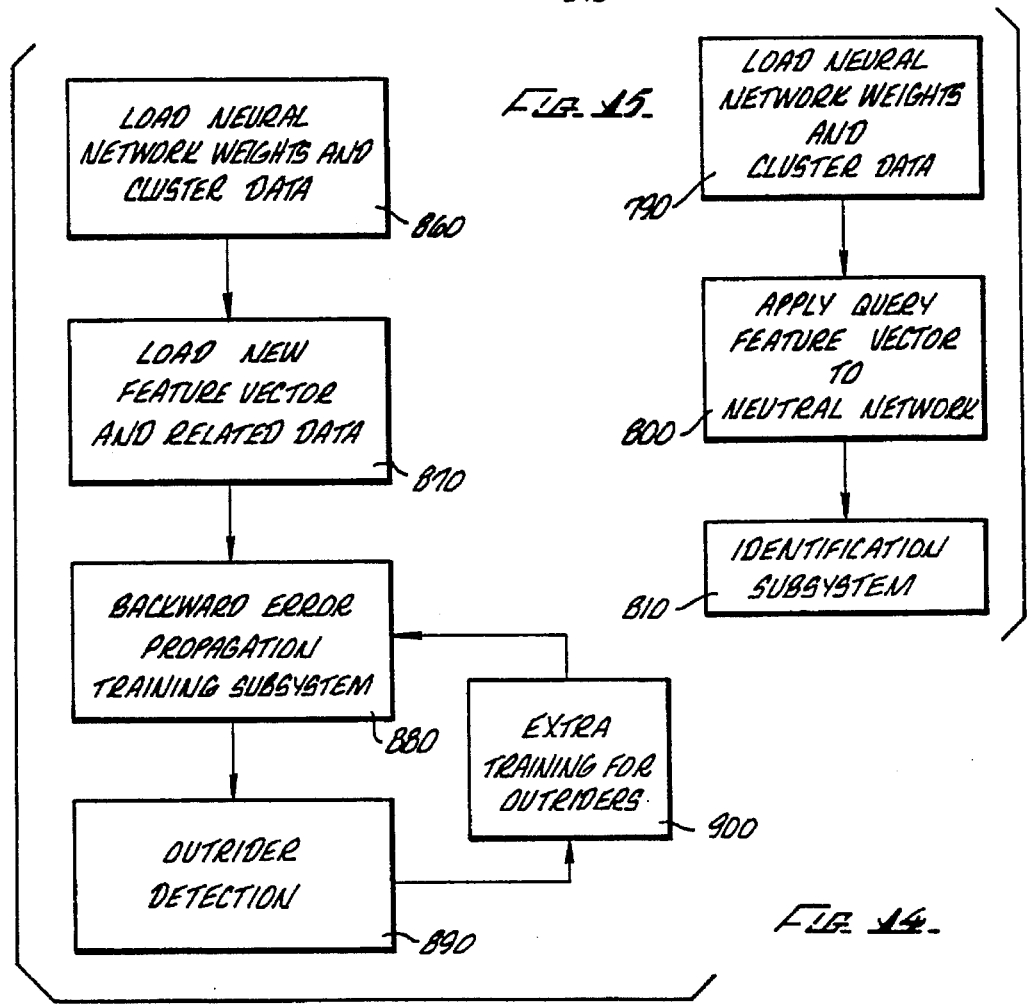

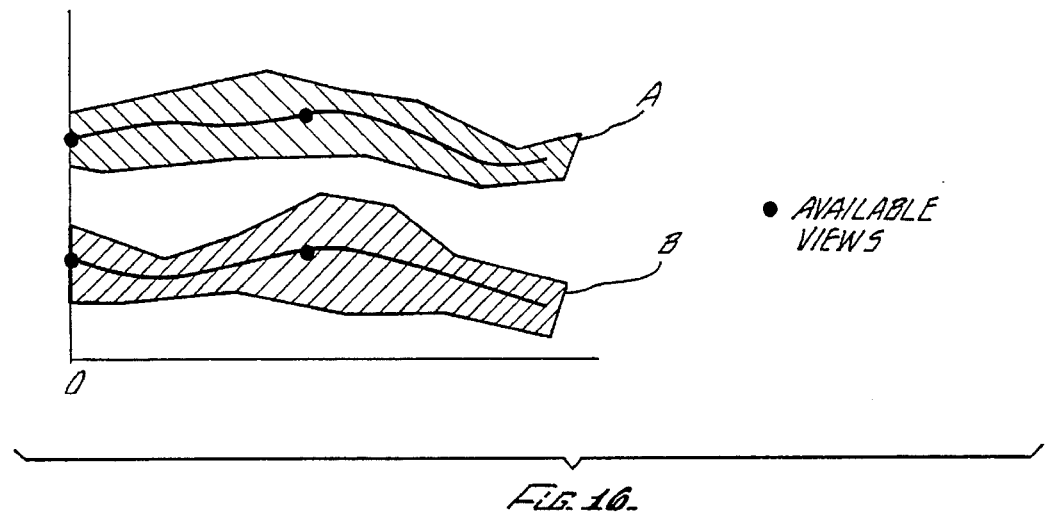
FIG. 16.
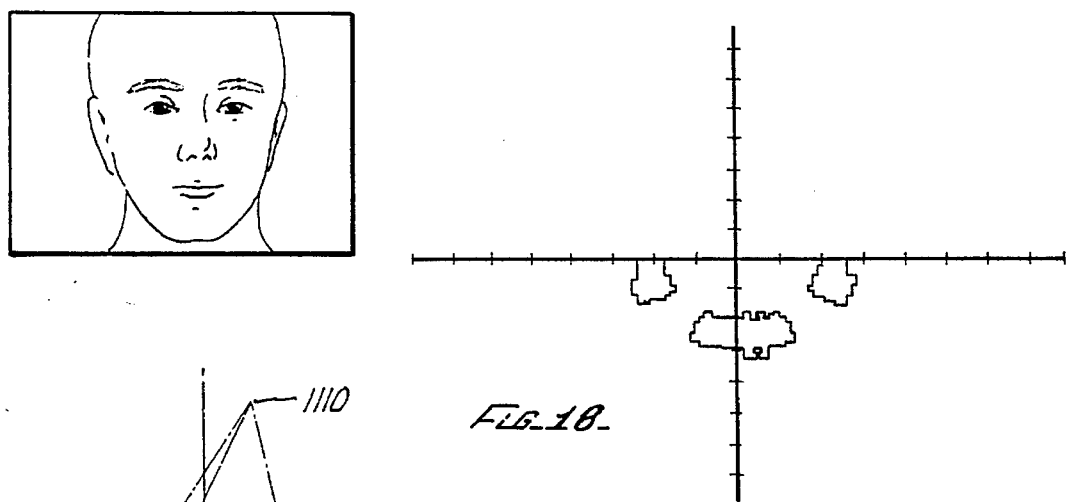
FIG. 17.
FIG. 18.
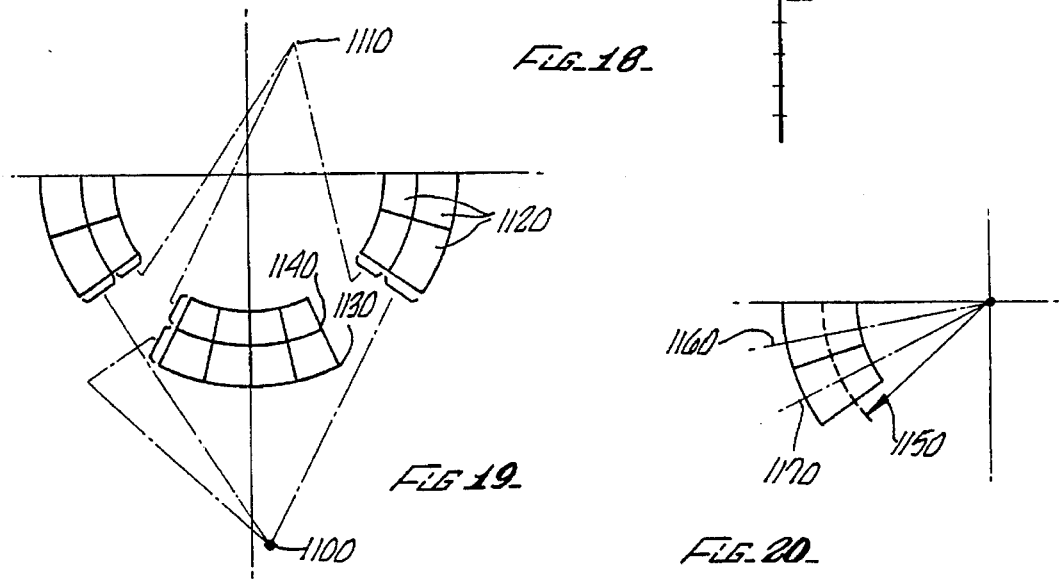
FIG. 19.
FIG. 20.

PATTERN RECOGNITION SYSTEM

CROSS-REFERENCE TO RELATED APPLICATIONS

This application is a divisional of U.S. patent application Ser. No. 07/920,188, filed Jul. 23, 1992, now U.S. Pat. No. 5,274,714, which is, in turn, a divisional of U.S. patent application Ser. No. 07/533,113, filed Jun. 4, 1990, now U.S. Pat. No. 5,161,204.

MICROFICHE APPENDIX

Four (4) microfiche are incorporated herein. Eight hundred eighty-seven (887) frames of computer program listings appear in the microfiche appendix.

BACKGROUND OF THE INVENTION

1. Field of the Invention

This invention relates generally to the field of information storage and retrieval. More particularly it relates to the field of rapid random access storage and retrieval of information, at least one element of which is not easily susceptible to quantitative description. Still more particularly it relates to a method and apparatus for storing and accessing difficult to quantify information and corresponding unique identifier elements in a neural network or simulated neural network computer processing environment. Still more particularly it relates to a method and apparatus for providing automated pattern recognition of certain types of image and analog data. Still more particularly it provides a method and apparatus for storing and retrieving information based upon variable and incomplete human facial image derived information.

2. Description of Related Art

As used herein, collections of information elements form information sets. Distinguishable or distinct information elements are different to the extent that they can be recognized as different from the other information elements in an information set. In order to apply automatic data processing techniques to determine whether an element of an information set is similar or identical to another element of such a set, it is necessary that the characteristics that differentiate the elements of such a set be invariant for each distinct element and communicable to the automatic data processing equipment. Generally, this problem is solved by quantifying the distinguishing characteristics of the elements of the set and sorting or comparing based upon such quantified characteristics.

A. Description of the Problem

Certain types of information are not easily quantifiable. For example, human faces, many types of image data, maps of areas of the globe, seismic traces, voice prints, fingerprints and the like comprise part of a set of visually perceivable data, generally recognizable and distinguishable by skilled humans, but not hitherto subject to effective quantitative identification or automated recognition. Virtually every discipline known to man today acquires vast quantities of image and analog data such as those described above, yet no effective means has existed for automatically recognizing patterns, similarities and identities from large quantities of that data. Modern computers are particularly well suited to the task of storing and retrieving digital data, such as inventory data based upon part numbers. And those same computers are well suited to identifying particular humans based upon unique identifying information such as social security numbers, drivers license numbers and the like. It is desirable, however, to provide a method and apparatus for storing, retrieving and recognizing the inherent unique patterns contained in the aforementioned types of information so that modern automated data processing techniques may be applied to the problems of identifying patterns, identities and similarities in such data.

Particular problems which need solving are: (1) The identification of human beings based upon photographic images of their faces. This problem arises in a number of contexts such as: (a) the identification of missing children, (b) the identification of known criminals from their mug shots, (c) the identification of persons posing a known threat to security (such as known terrorists) based upon prior photographs and captured video frames taken at airports and other areas of surveillance, (d) the verification of the identity of captured criminals based upon prior mug shots, (e) the identification of known criminals, and other individuals based upon previously acquired photographic and/or other image based information, (f) access control to secured areas based upon photographic identity and/or other image based information, (g) authorization to access automated tellers and use credit cards based upon photographic and/or other image based information, and (h) tracking the habits and behavior of key customers based upon photographic and/or other image based information; (2) The identification of photographs and prints of physical evidence such as foot prints, finger prints, tire prints, voice prints, and the like; (3) The identification of analog data such as signatures, seismic traces, and other analog data; (4) The identification of certain known objects within fields of photographic and/or other image based data; and (5) The identification and tracking of photographically perceivable objects.

B. Description of the Prior Art

Prior researchers have attempted to create systems for quantifiably categorizing facial image and analog data but not automated methods for retrieving it from large databases. For example, the "Identikit" is used in criminology to classify human facial images by breaking certain facial features down into a finite number of choices. The choices are then superimposed upon one another to "reconstruct" the human facial image. Other systems have attempted to define the contour lines of a human facial image and identify it based upon that information. Others have taken average gray levels taken from large area of human facial image and attempted to classify and identify human faces based upon such information. Such systems have not proven robust against rotation and translation of the face, expression and perspective changes, the introduction of artifacts such as beards, glasses, etc., nor have they proved practical for use in large databases of human facial images. An example of a very large human facial image database is the F.B.I. mug shot collection which has been estimated to contain over 20 million images. A typical access control system may need to recognize 200 to 1000 persons who have been previously identified as having authorized access to a controlled facility.

SUMMARY OF THE INVENTION

The present invention is a pattern recognition system which comprises a method and apparatus for storing and retrieving information. A preferred embodiment ("the system", or "PARES" for PAtern REcognition System) supports the storage and retrieval of two-dimensional image information coupled with unique identifier information (such as, for example, a serial number, or a Personal Identification Number or "PIN"). A series of images for storage coupled with unique identifiers (and possibly other information) are presented to the system. For each image, the system equalizes the image and performs a two dimensional linear transform. In a preferred embodiment the system generates a power spectrum from a two-dimensional complex fourier transform ("2DFFT"). Other transforms, such as the Mellin transform, for example, could be used. A Feature Extraction Subsystem provides a collection of ordered and preselected polar coordinate (r, θ) addresses of Feature Template Regions or "Bricks" in the Fourier space. The bricks are previously determined to be maximally distinctive areas of the 2DFFT of the input images with an in-class to out-of-class study performed by the Feature Template Generator Subsystem. The resulting 2DFFT is utilized to form, for each image presented, a unique feature vector whose elements comprise measured magnitude data from each of the ordered preselected regions in the Fourier transform of the image. The feature vector is input to a neural network (either physical or simulated in software). Upon completion of storage of the series of feature vectors of the input images, the neural network structure is recursively trained with a backward error propagation technique to optimize its ability to output a correct identification upon exposure to the feature vector of one of the images. Once loaded and trained, the system may be "shown" a two-dimensional query image which will be formed into a query feature vector for input to the neural network as above. If the neural network recognizes the image due to its similarity to a previously trained input image, an identification of the image corresponding to the images unique identifier may be output. Alternatively, a verification of identity signal can be generated for use by other apparatuses such as logging computers, electronic locks and the like. Alternatively, a probability of identification may be displayed or all "close" images in the database may be identified. Tolerance to rotation and translation and variations in expression, perspective, introduction of other artifacts and the like is provided to permit increased likelihood that non-identical images of identical objects will be recognized as one and the same. In one embodiment, two hidden levels are included in the structure of the neural network.

The present invention permits the above analysis to be performed on a small computer system such as a personal computer equipped with an appropriate DSP co-processor board and therefore permits the construction of low-cost devices that accomplish the goals set forth herein without the need to resort to large mainframe computers and supercomputers. Accordingly, it is an object of the present invention to provide a method and apparatus for storing and retrieving two-dimensional image or any other bounded analog pattern information with unique identifier information so that the unique identifier information may be retrieved by querying the apparatus with the two-dimensional image information.

It is a further object of the present invention to provide a method and apparatus for viewing images, storing information derived from the viewed images with unique identifier information uniquely corresponding to the subject of each of the viewed images, and upon query with one of the viewed images indicating recognition and optionally displaying the unique identifier information corresponding to the subject of the recognized image.

It is a further object of the present invention to provide a method and apparatus for controlling access to a place or thing.

It is a further object of the present invention to provide a method and apparatus for identifying known things among unknown things.

It is a further object of the present invention to provide a method and apparatus for identifying known objects in a photographic image.

It is a further object of the present invention to provide a method and apparatus for detecting the occurrence of a defined event.

It is a further object of the present invention to provide a method and apparatus for signature verification.

It is a further object of the present invention to provide a method and apparatus for fingerprint identification.

It is a further object of the present invention to provide a method and apparatus for mug shot identification.

It is a further object of the present invention to provide a method and apparatus for character recognition.

It is a further object of the present invention to provide a method and apparatus for data signature recognition.

It is a further object of the present invention to provide a method and apparatus for forgery identification.

It is a further object of the present invention to provide a method and apparatus for diagnosis of conditions depicted in image data.

Other and further objects and advantages of the present invention will appear hereinafter.

GLOSSARY OF TERMINOLOGY USED HEREIN

2DFFT: The normalized and scaled matrix containing the standard 2-dimensional complex fast Fourier transform power spectrum. As used herein, this is an operation performed to an image processed input image.

BACKWARD ERROR PROPAGATION: Method of training a neural network with supervised learning.

BRICK: Feature Template Region.

DSP: Digital Signal Processor.

FEATURE EXTRACTION SUBSYSTEM: Subsystem which accepts as input a Feature Template and an image processed 2DFFT of an input image and outputs a Feature Vector corresponding to the input image.

FEATURE TEMPLATE: List of Feature Template Regions in order of distinguishability.

FEATURE TEMPLATE GENERATION SUBSYSTEM: Subsystem for determining a Feature Template for a given sample of input images.

FEATURE TEMPLATE REGION: Area of Fourier space bounded by predetermined angles and radii.

FEATURE VECTOR: Vector of magnitudes corresponding to the power spectrum of an input image at the regions determined by the Feature Template.

FOURIER SPACE: Frequency space in which the Fourier transform of an input image exists.

IMAGE PROCESSING: Changes made to Input Images in order to ease further processing and analysis.

IN-CLASS TO OUT-OF-CLASS STUDY: Performed by the Feature Template Generation Subsystem. Orders the Feature Template Regions ("BRICKS") of the Fourier space by distinguishability.

INPUT IMAGE: Image supplied to PARES for training or recognition.

INPUT FEATURE VECTOR: Feature Vector formed from Input Image.

NEURAL NETWORK: Preferred environment for processing massively parallel mathematical operations and matrix mathematics. As used herein a neural network is a system of equations and stored matrices and vectors of values recursively implemented on a computer. Inputs to the neural network are used to train it to develop optimized weight matrices so that in recognition mode the inputs and weights will cause the system of equations to give the desired result indicating probability of recognition.

OTSU: Algorithm and subroutine implemented on the DSP used for contrast stretching.

OUTRIDERS: Certain Input Feature Vectors which do not permit minimum error convergence as rapidly as other Input Feature Vectors. Outriders are preferably allowed additional training cycles relative to other Impact Feature Vectors in order to Speed total error minimization.

PARES: Pattern Recognition System.

PERSONAL IDENTIFICATION NUMBER: PIN

PIN: Personal Identification Number or Unique Identifier Number.

POINT: Discrete data point in Fourier space.

QUERY FEATURE VECTOR: Feature Vector formed from a Query Image. A query feature vector, upon input to the neural network, causes an output from the neural network. If recognition has occurred, this output may used as a pointer into a database of further information correlated with the subject of the query feature vector.

QUERY IMAGE: Image input to the Recognition Mode of PARES.

RECOGNITION MODE: Mode of operation of PARES in which input images are presented to the trained neural and either recognized or not recognized.

RECURSIVE TRAINING: Method of training a neural network which includes backward error propagation.

SUPERVISED LEARNING: Method of training a neural network where the answer is known and is fed back until the weights necessary to yield the correct answer are determined.

THE SYSTEM: PARES.

TRAINING MODE: Mode of operation of PARES in which input images are loaded into the system so that the system can learn to recognize those images.

TWO DIMENSIONAL LINEAR TRANSFORM: A linear transform such as a 2DFFT or a Mellin transform or another transform.

UNIQUE IDENTIFIER NUMBER: Unique identification of the subject of an input image. Permits identification of matching input image in recognition mode.

LIST OF REFERENCE NUMERALS USED HEREIN

100 Computer
110 Keyboard
120 Disk Drive Controller
130 Floppy Disk
140 Hard Disk
150 N-100 Digital Signal Processor and Frame Grabber Board
160 CCD Camera
170 RS 170 Monitor
180 VGA Video Controller
190 VGA Display
200 I/O Ports
210 Binary Control System
220 Power Supply
230 Imaging Subsystem
240 Feature Template Generation Subsystem
250 Feature Extraction Subsystem
260 Feature Template
270 Feature Vector
280 Neural Network Subsystem
290 Output Control Subsystem
300 User Interface
310 Image Acquisition Subsystem
320 Image Acquisition to Image Processing Interface
330 Image Processing Subsystem
340 Input Functions of User Interface
350 Output Functions of User Interface
360 Trinary Mode Selection Facility
370 Training Mode
380 Recognition Mode
390 Review Mode
400 Text Input Facility
410 Binary Activation Facility
420 "Enter" Facility
430 "Print" Facility
440 Training Status Display
450 Training "Success"
460 Training "Failure"
470 Diagnosis and Analysis Information
480 Recognition Status Display
490 Recognition "Success"
500 Display Unique Identifier
510 Indicate Lack of Recognition
520 Review Status Display
530 Printer Output (if desired)
540 Video Signal
550 Frame Grabber Software
560 Digitized Image
570 Contrast Stretching Subsystem
580 OTSU Subroutine
585 Contrast Enhancement
590 Windowing and Scaling Subsystem
600 Calculate the Centroid Along the Horizontal Axis of the Digital Image
602 Scan Image Horizontally and Sum Vertical Columns
604 Compute First Moment of Image
606 Sum Image Components
608 Sum÷First Moment=Centroid
610 Determine A 64 Pixel Wide Vertical Strip at Horizontal Center of Image
620 Perform Scan of Strip to Obtain Power Profile in the Vertical
630 Determine Image Center
640 Center Image
650 Scale Image to 128×128 Pixel Full Frame
660 Output a 128×128 Pixel Full Frame Box Around Center of Full Face
670 Roll Off Subsystem
680 Fourier Transformation Subsystem
690 Calculate Standard Complex 2DFFT and Power Spectrum of Input Image
700 Normalize Power Spectrum By Division By Maxima
710 Scale Power Spectrum From 0 to 255
720 128 Vertical×64 Horizontal Matrix of Floating Point Numbers Representing Fourier Power Spectrum
730 Generate Feature Vector for Input Image Data
740 For Each Defined Location From Feature Template Set Feature Vector to Corresponding Average in Input Image Data
750 Content Based Cluster Addressing Subsystem
760 Recall Appropriate Cluster Information
760 Neural Network Search Subsystem
770 Neural Network Structure
780A Neural Network Weights (Recall)
780B Neural Network Weights (Store)
790 Load Neural Network Weights and Cluster Data 800 Apply Query Feature Vector to Neural Network
810 Identification Subsystem
820 Output Control Subsystem
830 Indicate Unique Identifier Number
840 Indicate Found/Not Found
850 Neural Network Training Subsystem
860 Load Neural Network Weights and Cluster Data
870 Load New Feature Vector and Related Data
880 Backward Error Propagation Training Subsystem
890 Outrider Detection
900 Extra Training for Outriders
910 Indicate Training Success/Failure
920 Input All Available Images
921 Subject All Available Images to Image Processing Subsystem 330
930 Generate In-Class Variation Matrix [ICVM]
940 Sort Images into Subgroups of Images of Same Subject
950 For Each Subgroup Form Mean Matrix for the In-Class Group
960 Create In-Class Variation Matrix
970 Normalize ICVM [In-Class Variation Matrix]
980 Set Thresholds for ICVM [In-Class Variation Matrix]
990 Generate Out-Class Variation Matrix [OCVM]
1000 Average All Mean Matrices for the In-Class Groups into Overall Sample Mean Matrix
1010 Create Out-Class Variation Matrix [OCVM]
1020 Normalize OCVM [Out-Class Variation Matrix]
1030 Set Thresholds for OCVM [Out-Class Variation Matrix]
1040 Feature Template Computation
1050 Create Feature Matrix
1060 Normalize Feature Matrix
1070 Set Thresholds for Feature Matrix
1080 Partition Feature Matrix into Bricks
1090 Form Feature Template
1100 Outer Ring
1110 Inner Ring
1120 Wedge
1130 Circular Arc (outer)
1140 Circular Arc (inner)
1150 Average Radius
1160 Average Angles
1170 Average Angles
1180 Input Layer

BRIEF DESCRIPTION OF THE DRAWINGS

FIG. 2 is a block diagram of the major software subsystems according to a preferred embodiment of the pattern recognition system of the present invention.

FIG. 3 is a block diagram of the Imaging Subsystem according to a preferred embodiment of the pattern recognition system of the present invention.

FIG. 4 is a block diagram of the User Interface according to a preferred embodiment of the pattern recognition system of the present invention.

FIG. 6 is a block diagram of the User Interface Output according to a preferred embodiment of the pattern recognition system of the present invention.

FIG. 7 is a block diagram of the Image Acquisition Subsystem according to a preferred embodiment of the pattern recognition system of the present invention.

FIG. 9 is a block diagram of the Windowing and Scaling Subsystem according to a preferred embodiment of the pattern recognition system of the present invention.

FIG. 10 is a block diagram of the Fourier Transformation Subsystem according to a preferred embodiment of the pattern recognition system of the present invention.

FIG. 12 is a block diagram of the Feature Extraction Subsystem according to a preferred embodiment of the pattern recognition system of the present invention.

FIG. 14 is a block diagram of the Neural Network Training Subsystem according to a preferred embodiment of the pattern recognition system of the present invention.

FIG. 15 is a block diagram of the Neural Network Search Subsystem according to a preferred embodiment of the pattern recognition system of the present invention.

FIG. 16 is a diagram showing feature vector trajectories for two individuals. The shaded regions represent variability in an individual due to variations in lighting, facial expression, facial hair, glasses, etc.

FIG. 17 is a diagram showing a facial image after windowing and scaling have been performed.

FIG. 18 is a diagram showing a representation in Fourier space of the Feature Template and Feature Template Regions for a facial image such as that depicted in FIG. 17.

FIG. 19 is a diagram of the Feature Template.

FIG. 20 is a diagram of a portion of the Feature Template.

DESCRIPTION OF THE PREFERRED EMBODIMENTS

The preferred embodiments of the present invention are set forth below. Throughout, the implementation of the PARES Pattern Recognition System will be discussed in the context of human facial recognition. It is to be understood, however, that the system is capable without further modification of successful storage and recognition of many other types of images or repetitive analog signals as shown and described herein.

I. GENERAL OVERVIEW OF SYSTEM

Generally, a series of images typical of those expected to be found in the images to be treated by PARES are collected. These are image processed and subjected to a 2DFFT process implemented in software and are then input to a Feature Template Generation Subsystem. The Feature Template Generation Subsystem compares the images and performs an In-Class to Out-of-Class study similar to the Rayleigh Quotient technique of the accumulated FFT data for the entire population. A Feature Template is then generated which consists of a series of ordered Feature Template Regions in the polar coordinates of the Fourier space. The highest ordered of these regions have the characteristic that among images of different objects they tend to have large variances in magnitude and among images of the same object they tend to have low variances in magnitude. Thus they tend to provide maximal discriminatory information. A Feature Vector for each image to be applied to the neural network can then be created based upon the magnitude data for each of the Feature Template Regions. The Feature Vectors to be input to the neural network are applied and the neural network is trained utilizing a supervised learning technique known as backward error propagation. Statistical tests are performed upon the output of the neural network to determine when an acceptable level of training has been achieved. Once trained, the neural network can be queried as to whether it recognizes a query image. Generally a query image will be image processed and a Query Feature Vector generated. The Query Feature Vector will be applied to the neural network. If the Query Feature Vector results in a neural network output indicating recognition, action appropriate to recognition may be taken (such as displaying the identity or permitting access and the like). If the Query Feature Vector results in a neural network output indicating no recognition, similarly appropriate action may be taken (such as denying access and alerting security personnel and the like).

A. MARDWARE

Figure 1:
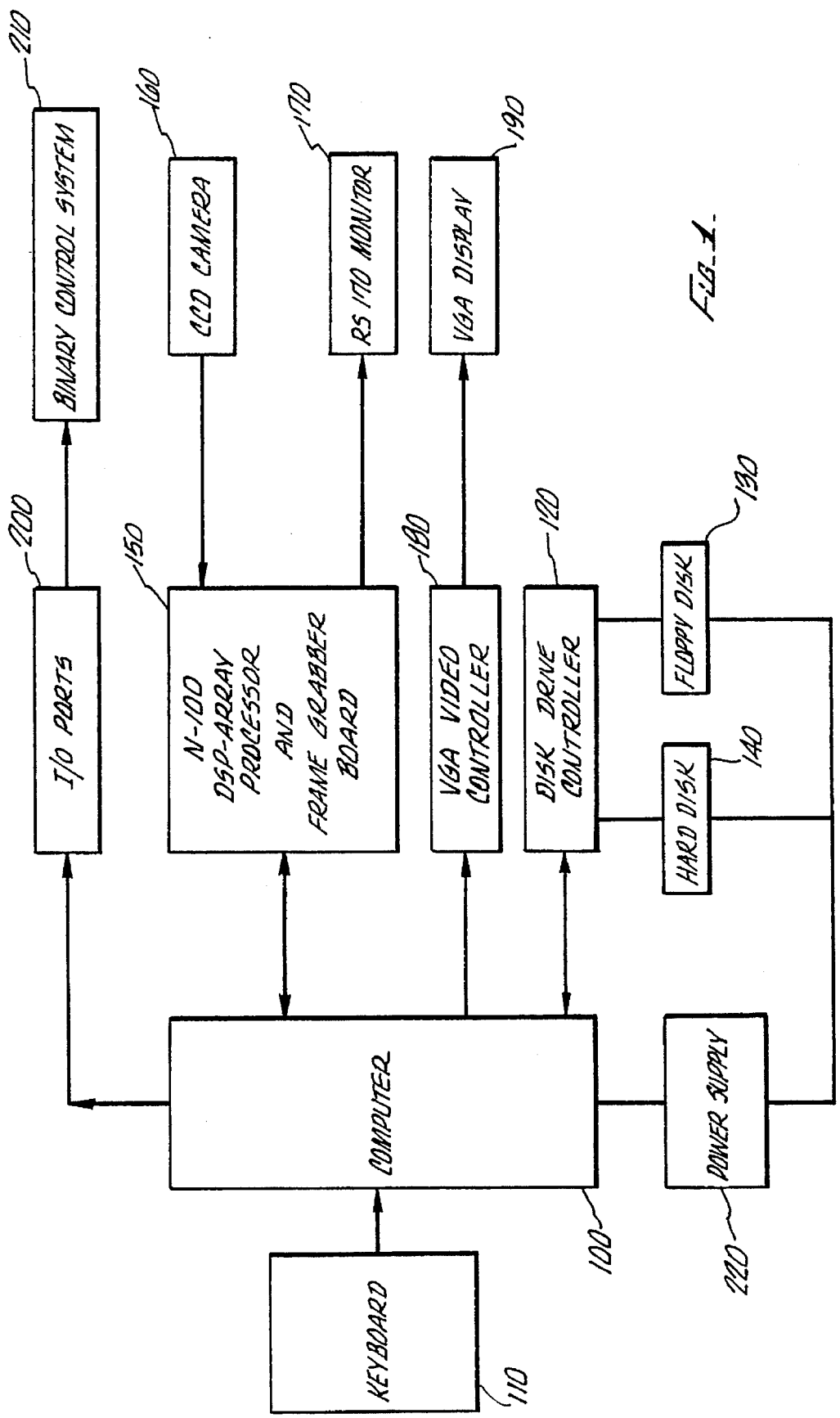
FIG. 1 is a system hardware block diagram according to a preferred embodiment of the pattern recognition system of the present invention.

A system block diagram of the PARES hardware aspects according to a preferred embodiment of the present invention is set forth at FIG. 1. A computer 100 is preferably an IBM PC-AT compatible computer having an Intel 80386 or Intel 80286 microprocessor. Connected to the computer 100 is a keyboard 110 for input. Optionally, computer mice (not shown) and similar devices may also provide input as is well known in the art. A disk drive controller 120, floppy disk 130 and hard disk 140 provide magnetic memory storage as is well known in the art. Other memory storage could also be used as is well known in the art.

An N-100 Digital Signal Processor and Frame Grabber Board 150 is preferably attached to the PC-AT computer bus at an expansion slot location. The N-100 (150) is an implementation of a standard frame grabber and a digital signal processor board. Feature vector extraction and neural network computations are performed on the DSP portion of the N-100 Board. The N-100 DSP board comprises a straightforward implementation of the AT&T DSP32C digital signal processing chip and related circuitry, high speed memory and related circuitry, frame grabber and related circuitry, and bus control circuitry. The frame grabber circuitry and DSP functions are combined on one card to minimize the volume taken up within the computer, to minimize the number of expansion card slots used in the computer, and to promote high speed communication between the frame grabber circuitry and the DSP circuitry without the need to communicate via the slower PCAT bus structure. It would be well within the capabilities of one of ordinary skill in the art to adapt the N-100 card (or a similar card) to operate with other bus circuitry such as VME, MULTIBUS, or any other potential computing environment. As well known in the art, the N-100 Frame Grabber functions could be replaced with a standard Frame Grabber board such as the BEECO Model FG-B100 available from Beeco, Inc., the ITI PC Vision Plus available from Imaging Technology, Inc., and the Matrox Model MVP-AT available from Matrox, Inc. The N-100 Digital Signal Processing Functions could be replaced by a standard DSP board supporting a digital signal processor such as the Eighteen-Eight Laboratories of Boulder City, Nev., Model PL800, PL1250 and PL1252 Floating Point Array Processor DSP Boards which support the DSP32C chip or the ITI Image 1208 available from Imaging Technology, Inc. The system concept may be implemented on other DSP chips such as the Texas Instruments TMS320C30 or the Analog Devices, Inc. part no. ADSP21000. A schematic diagram of the N-100 board is included in U.S. Pat. No. 5,274,714, issued on Dec. 28, 1993, and hereby incorporated by reference as if set forth fully herein.

The N-100 DSP board 150 preferably includes 2 megabytes of video memory and operates the digital signal processor chip at 25 megaflop rates. Video memory is preferably coupled directly to the DSP bus to permit high speed data manipulation and operation of the DSP in the most efficient manner. The 2 megabytes of video memory permit as many as four independent analog video inputs to be processed on each N-100 board. The preferred system architecture permits operation of as many as four DSP boards in parallel yielding as many as 16 analog video inputs and operating at a combined DSP rate in excess of 100 Mega Flops. In a preferred embodiment, as many as eight DSP boards with a total of 32 video inputs will be supported for a combined DSP rate in excess of 200 Mega Flops.

A CCD camera 160 provides an analog video input and is attached to the frame grabber portion of the N-100 board (150). CCD camera 160 is utilized to capture input images. Many electronic imaging systems other than a CCD camera could be made to work in this application by one of ordinary skill in the art. For example, images could be obtained from any storage medium which can interfere with the PC-AT bus. This includes optical disc, CD, magnetic tape, floppy disk, DAT or 8 mm streamer tapes, hard disks and many other devices. An RS-170 monitor 170 is also attached to the N-100 board 150 in a preferred embodiment in order to provide a convenient monitoring capability for acquired images.

A VGA video controller 180 and VGA video display 190 provide video output to the operator as is well known in the art.

Standard I/O ports 200 are provided which are adapted to at least operate a binary control system 210 which in a preferred embodiment is an electronic lock having a locked state and an unlocked state.

A power supply 220 provides necessary voltage to the various hardware components as shown.

The Digital Signal Processor or "DSP" of a preferred embodiment supports 16 or 24 bit fixed point arithmetic, 32 bit floating point arithmetic, 25 million floating point operations per second, a 32 bit data bus, 256 KBytes to 1.5 MBytes of high speed static RAM, a 16 bit host interface, and a 16 bit host DMA with buffering for 32 bit local DMA.

As would be well known to one of skill in the art, any number of different hardware configurations would easily be made to work. While the preferred embodiment is based on a PC-AT class machine of the Intel 80286 or 80386 type, with no additional modification, the system can operate on the new EISA class high speed bus systems or with minor modifications which would be well known to those of ordinary skill in the art on the Microchannel PS/2 systems. There is no requirement that a personal computer be used. For example, the system could be implemented without further invention on a mini computer, main frame computer, super computer such as a Cray X-MP, Cray Y-MP, or equivalent, or on virtually any general purpose computer.

B. SOFTWARE

1. NEURAL NETWORK OVERVIEW a. Neural Network Theory

A neural network has been defined as a computing system made up of a number of simple, highly interconnected processing elements, which processes information by its dynamic state response to external inputs.

A serial computer is a single, central processor that can address an array of memory locations. Data and instructions are stored in the memory locations. The processor ("CPU") fetches an instruction and any data required by that instruction from memory, executes the instruction, and saves any results in a specified memory location. A serial system (even a standard parallel one) is essentially sequential: everything happens in a deterministic sequence of operations.

In contrast, a neural network is not sequential. It has no separate memory array for storing data. The processors that make up a neural network are not highly complex CPUs. Instead, a neural network is composed of many simple processing elements that typically do little more than take a nonlinear function of the weighted sum of all its inputs. The neural network does not execute a series of instructions; it responds, in parallel, to the inputs presented to it. The result is not stored in a specific memory location, but consists of the overall state of the network after it has reached equilibrium condition.

Knowledge within a neural network is not stored in a particular location. One cannot inspect a particular memory address in order to retrieve the current value of a variable. Knowledge is stored both in the way the processing elements are connected (the way the output signal of a processing element is connected to the input signals of many other processing elements) and in the importance (or weighting value) of each input to the various processing elements.

The neural network weight matrix produced in system training under this embodiment represents a distributed description of the population on which it was trained, with all elements describing all objects simultaneously, and no single element associated with any particular object. Thus, the system is relatively immune to corruption by the destruction of any single weight element or combination of elements. The rules by which the weight matrix is organized is generated internally and not subject to inspection, and are dependent on the examples presented in training.

b. Neural Network Operation

Generally a neural network is made up of many simple interconnected processing elements. Each processing element receives a number of weighted inputs. This comprises an input vector and a weight matrix. From the weighted total input, the processing element computes a simple output signal.

The output signal is computed as a result of a transfer function of the weighted inputs. The net input for this simple case is computed by multiplying the value of each individual input by its corresponding weight or, equivalently, taking the dot product of the input vectored weight matrix. The processing element then takes this in value and applies the transfer function to it to compute the resulting output.

c. Neural Network Learning

Normally (although no always) the transfer function for a given processing element is fixed at the time a network is constructed. In order to change the output value (learn), the weighted input needs to be champed. A neural network learns by changing the weights associated with all o the input examples. Learning in a neural network may be "supervised" or "unsupervised". In the presently described preferred embodiment, "supervised" learning is utilized. In supervised learning, the network has some omniscient input present during training to tell it what the correct answer should be. The network then has a means to determine whether or not its output was "correct" and has an algorithm with which to adjust its weights to yield a "better" output in the future.

2. SPECIFIC SOFTWARE IMPLEMENTATION a. System Software Components i. Operating System

The preferred system requires a PC-DOS operating system such as DOS 3.3 (or compatible) available from Microsoft Corporation. The operating system is compatible with 16 or 32 bit operation and access to expanded and extended memory out to the full limits of the Intel 80286/80386 architecture. All system and program related input/output from keyboard, mouse, light pen, disks, voice output, communications, printing and display is performed through DOS.

ii. Environment

A single or multi-user multi-tasking environment is preferably supported. The system may operate either in stand alone mode in the DOS partition or with DOS extender programs such as Desqview and VM386.

iii. MetaWindows

The system preferably operates under MetaWindows allowing compatibility with a wide variety of input and output and display devices. MetaWindows is a software graphics tool kit which provides windowed display capabilities. Such capabilities are well known and commonly available in the art and will not be described further herein.

iv. Standard C Environment

The preferred software has been developed under Microsoft C 5.1, and all DSP microcode and interfacing is compatible with most available C compilers such as Turbo C or Lattice. In addition, the existing system libraries are compatible with other languages and compilers such as Pascal and Fortran.

v. DSP microcode

A library of mathematical and image processing routines has been microcoded for the DSP32C. The code actually used is set forth in the microfiche program listing Appendix B.

b. PARES Specific Software

The PARES specific software system is described in detail below. An outline form is utilized for ease of expression. The full text of the source code of a preferred embodiment of the software is set forth in the microfiche program listing Appendix C.

The PARES software of a preferred embodiment of the present invention comprises a collection of subsystems which perform various tasks as described below. A control portion of the PARES software determines, based upon inputs and context, which portion of which subsystem should be accessed at any given moment.

FIG. 2 sets forth a block diagram of the major subsystems of the PARES software. The Imaging Subsystem 230 includes the operations related to image acquisition and image processing. The Imaging Subsystem 230 outputs to either the Feature Template Generation Subsystem 240 or the Feature Extraction Subsystem 250. The Feature Extraction Subsystem 250 accepts Imaging Subsystem 230 data and a Feature Template 260 from the Feature Template Generation Subsystem 240. The Feature Extraction Subsystem outputs the Feature Vector 270 to Neural Network Subsystem 280 which in turn provides an output to the Output Subsystem 290.

IMAGING SUBSYSTEM 230

A block diagram of the Imaging Subsystem 230 is set forth at FIG. 3. A User Interface 300 provides user input control over the entire system. This controls primarily the Image Acquisition Subsystem 310. An Image Acquisition to Image Processing Interface 320 directs acquired images from the Image Acquisition Subsystem 310 to the Image Processing Subsystem 330.

USER INTERFACE 300

The User Interface 300 is block diagrammed at FIG. 4 and comprises input functions 340 and output functions 350.

Figure 5:
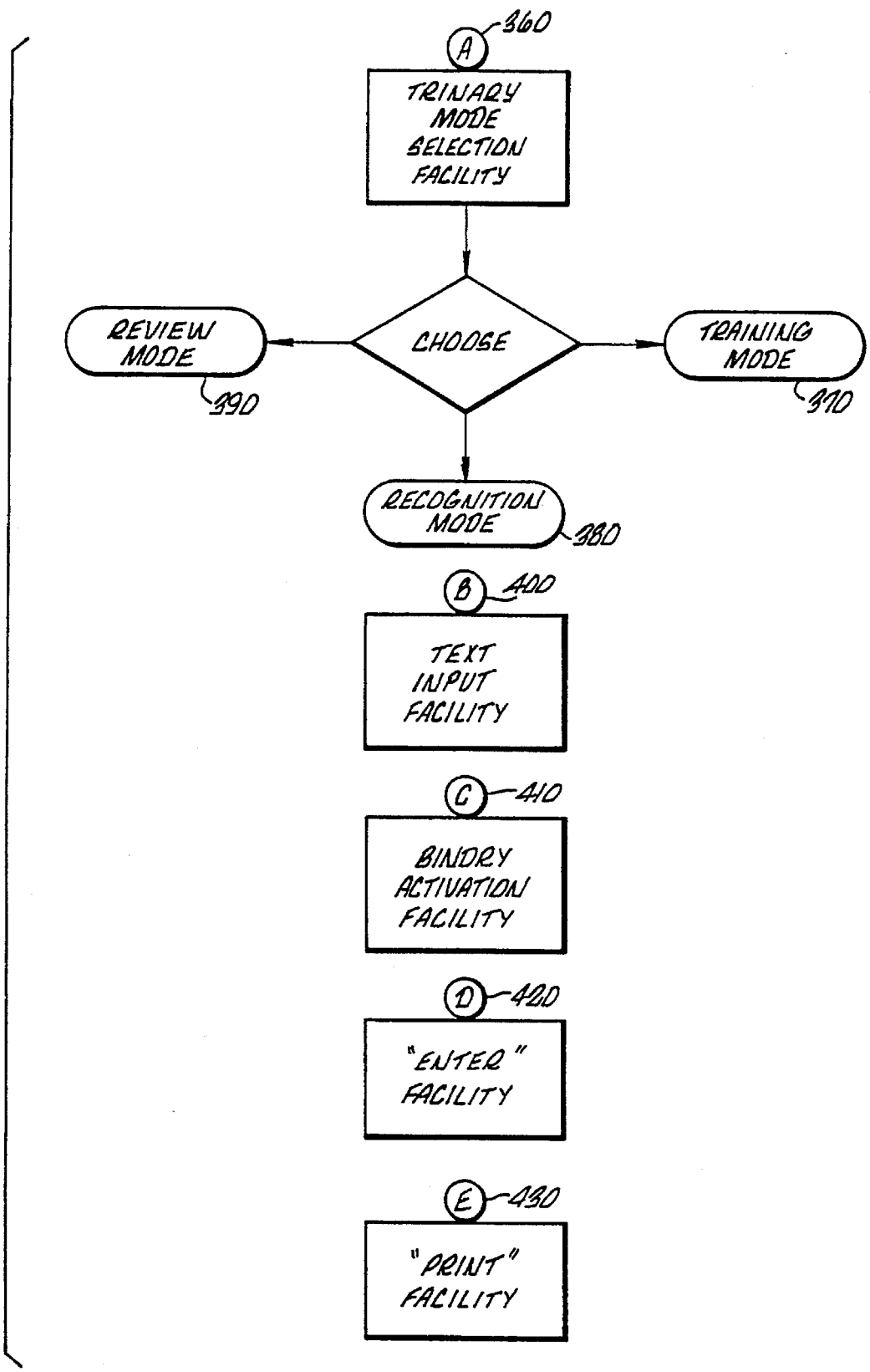
FIG. 5 is a block diagram of the User Interface Input according to a preferred embodiment of the pattern recognition system of the present invention.
Figure 8:
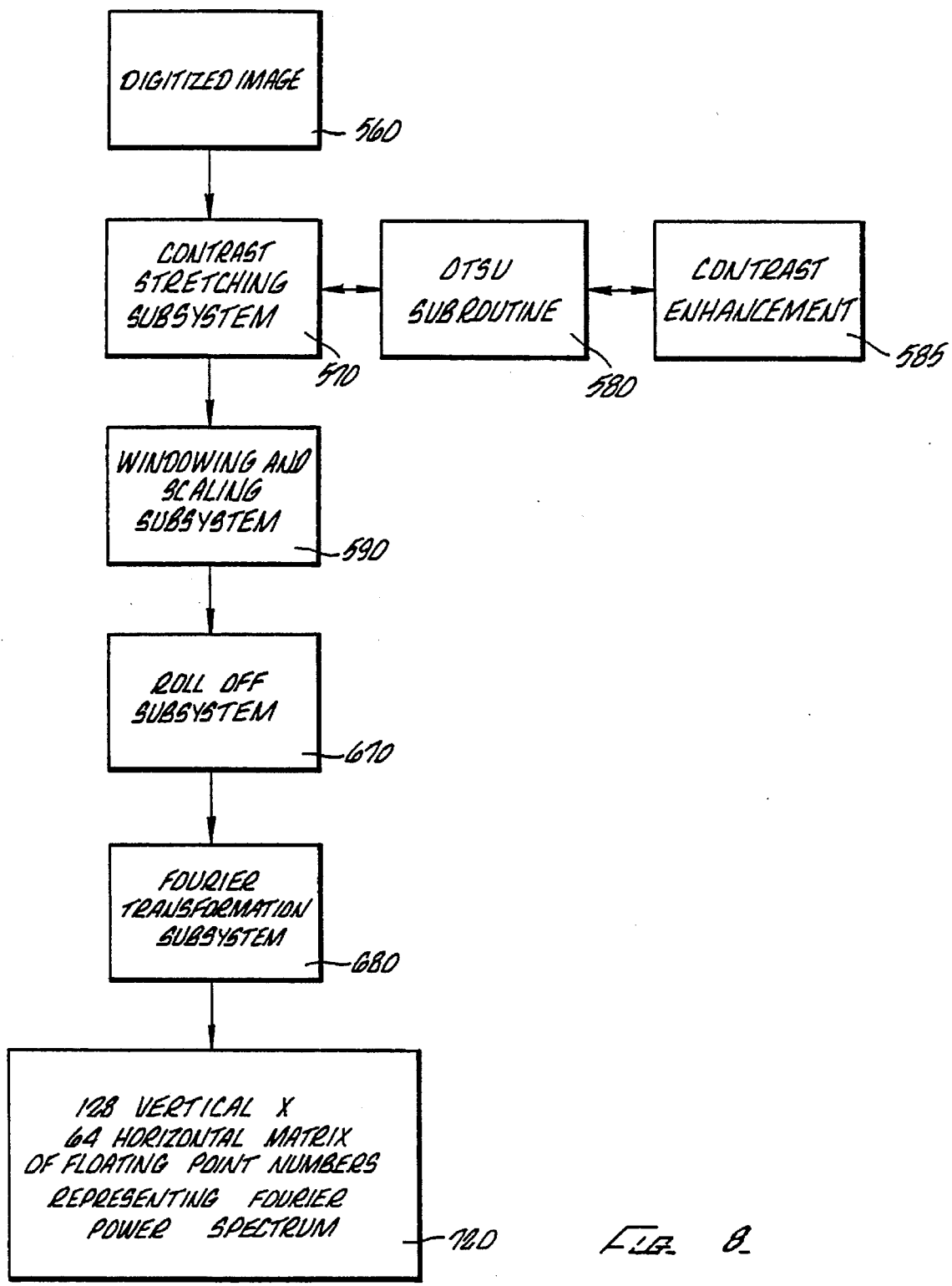
FIG. 8 is a block diagram of the Image Processing Subsystem according to a preferred embodiment of the pattern recognition system of the present invention.

The input functions 340 include (1) a trinary mode selection facility 360 to allow a user to select between training 370 (FIG. 5), recognition 380, and review 390 modes; (2) a text input facility 400 to enter a 32 character unique identifier during training; (3) a binary activation facility 410 (on/off) for activating the software; (4) a unitary ENTER facility 420 for prompting the Image Acquisition Subsystem to accept an image; and (5) a unitary PRINT facility 430 for commanding an optional printer peripheral device (not shown).

The output functions 350 include (1) a training status indicator 440 which indicates training success 450 or training failure 460 and upon failure 460 provide diagnosis and analysis information 470; (2) a recognition status indicator 480 which indicates recognition success 490 together with displaying the unique identifier number 500 upon recognition of a presented image or recognition failure 510 upon failure to recognize a presented image; and (3) a review status display 520 which permits display and/or printer output 530 as required of system information.

OPERATOR TASKS

The preferred embodiment of the PARES requires an operator in attendance for certain operations. The operator insures that the various components of the system are turned on and properly connected. The operator selects the mode (Recognition, Training, Review) and, where necessary, assures that subjects or object examples presented for training or recognition are in camera view. The operator may take the steps indicated as appropriate for various recognition and non-recognition scenarios (e.g., let person in, call police, etc.). In training mode, the operator may have the subject look in a number of different directions to capture several "In-Class" images for future processing. The operator may supply the system with a unique identifier number for a subject. In the review mode, certain data displays and printouts are available to the operator if desired.

IMAGE ACQUISITION SUBSYSTEM 310

The Image Acquisition Subsystem 310 of a preferred embodiment is block diagrammed at FIG. 7 and takes an RS-170 compatible video signal 540, maximum 1 volt peak to peak. Typically this can be provided by a standard CCD video camera 160 (FIG. 1) or other compatible device. Virtually any means for electronically representing an image could be used to obtain an image. A frame grabber 150 (FIG. 1) under he control of frame grabber software 550 digitizes the video signal 540 and outputs a digitized image 560 having between 128×128 pixels and 512×512 pixels of data.

IMAGE ACQUISITION TO IMAGE PROCESSING INTERFACE 320

In a preferred embodiment, the Image Acquisition Subsystem 310 outputs up to a 512×512 pixel/digitized image 560 to the Image Processing Subsystem 330. A minimum of a 128×128 pixel digitized image 560 is needed in a preferred embodiment for input to the Image Processing Subsystem 330.

IMAGE PROCESSING SUBSYSTEM 330

The Image Processing Subsystem 330 comprises the Contrast Stretching Subsystem 570, the Windowing and Scaling Subsystem 590, the Roll Off Subsystem 670 and the Fourier Transformation Subsystem 680.

CONTRAST STRETCHING SUBSYSTEM 570

The image is maintained as an 8-bit grayscale image with 256 possible values per pixel. A histogram of the image is composed of the number of occurrences of each value. The Contrast Stretching Subsystem 570 subjects the histogram of he 8-bit grayscale image to several passes of a statistical process, known to those of skill in the art as the "OTSU" algorithm, to identify the band of gray levels which most probably contain the facial data. This is possible because the scaling and clipping of the image data determines that approximately 70% of the Area of Interest is facial region and will identify itself as a discernible clump or grouping of pixel intensities in the middle of the histogram. The intensity range for this clump or grouping is then stretched linearly to encompass the maximal dynamic range for facial tones. Thus, the stretching routine produces lower and upper bounds of this clump that are used to re-map the smaller range of gray levels to full range, with the lower bound stored as a zero and the upper bound stored as a 255.

OTSU is described, for example, in "A Threshold Selection Method from Gray-Level Histograms," Nobutaki Otsu, I.E.E.E. Transactions on Systems, Man and Cybernetics, Vol. SMC- 9, No. 1, January 1979, pp. 62–66. The OTSU algorithm is implemented in the DSP code contained in Appendix B.

WINDOWING AND SCALING SUBSYSTEM 590

The windowing and scaling subsystem 590 extracts a "window" from the center facial area of the input image in a preferred embodiment of the present invention and centers and scales the image to produce a 128 vertical by 128 horizontal pixel image.

CALCULATE THE CENTROID ALONG HORIZONTAL AXIS OF DIGITIZED IMAGE 600

The Centroid of a digitized image on N pixels by M pixels is calculated as follows:

Let $G_{ij}$ be the grayscale intensity of the i-th horizontal and the j-th vertical pixel. We generate the vector $$V_i = \Sigma_j G_{ij} \tag{1}$$

The First Moment about the horizontal axis of this digitized image is then $$I = \Sigma_i i V_i \tag{2}$$

The Gray level sum is then calculated:

$$G = \Sigma_i \Sigma_j G_{ij} \tag{3}$$

The index of the desired centroid is then:

$$I/G \qquad (4)$$

In practice, the digitized image 560 (array) is scanned horizontally 602 to form a vector of dimension equal to the horizontal number of pixels in the digitized image 560. The elements of this vector consist of the sum of the vertical gray level values for each column in the horizontal scan. The First Moment of the digitized image 560 (a scalar value) is computed 604 by scanning (summing) over the index of the vector, the vector content multiplied by the index number of the vector. Now the total gray level values of the array re summed 606 to form another scalar value. This sum is divided by the First Moment of the array 608 to obtain the index of the vertical centerline of the facial image in the digitized image 560.

CALCULATE A VERTICAL CENTER OF FACE ALONG VERTICAL CENTERLINE OF DIGITIZED IMAGE

Once the horizontal center has been determined 600, a vertical strip of pixels of dimension (image height)×(64) will be centered about the horizontal centerline 610.

Within the vertical strip, each pixel is weighted by a probability density value by simply multiplying the density value by the pixel value. This probability density has been determined for a preferred application in the following manner: a sample of images characteristic of the images in the database taken under similar lighting and camera conditions was analyzed. The pixel value of the nose location for each was recorded. A Gaussian distribution of nose pixel intensities was assumed and the population mean was used to estimate the Gaussian mean. Once the probability weighting has been performed, the values along each horizontal line are summed within the vertical strip to yield a single vertical array 620. The element in the array with the highest value is taken as the vertical center.

The center of the face is simply the horizontal center and the vertical center 630. The image is centered 640 using standard techniques and then scaled so that the full center face area occupies a 128 vertical×128 horizontal pixel frame 650. See, e.g., FIG. 17. This image is output 660 to the Roll Off Subsystem 670.

ROLL OFF SUBSYSTEM 670

The components of the image outside the face box are suppressed with a smooth rolloff function as is well known in the art. The output of the Roll Off Subsystem 670 is presented to the Fourier Transformation Subsystem 680.

FOURIER TRANSFORMATION SUBSYSTEM

The Standard 2-dimensional complex FFT is calculated and the power spectrum generated from that spectrum 690 ("2DFFT"). The power spectrum is then normalized 700 by division by its maxima (excluding the DC value) and scaled from 0 to 255 (710). The output of this process is a 128×128 matrix of floating point numbers between 0.0 and 255.0 representing the 2-dimensional Fourier power spectrum 720. In practice the lower two quadrants of the 2DFFT are used. In another preferred embodiment, other two dimensional linear transforms, such as, for example, the Mellin transform, could be utilized either as a total replacement for, or in conjunction with the Fourier transform as discussed herein. No intent is expressed herein to exclude the Mellin or other two dimensional linear transforms from the scope of the invention, however, in the interests of simplicity, the Fourier transform will generally be referred to herein where it or another transform could be used as would be known to those of skill in the art.

FEATURE EXTRACTION SUBSYSTEM 250

The Feature Extraction Subsystem takes the 2-dimensional Fourier power spectrum 720 and overlays the Feature Template 260. The Feature Template 260 generated by the Feature Template Generation Subsystem 240 is composed of an ordered set of regions called "bricks", each bounded by pairs of coordinate axes and defined by the minimum and maximum points. For each brick in the Feature Template, there is a corresponding component in the Feature Vector 270. The value of each component in the Feature Vector is generated 730 by averaging the values of the Fourier power spectrum 740 that fall within the brick or region to which it corresponds. The output of the Feature Extraction Process is a Feature Vector of up to several hundred ordered floating point numbers. The actual number generated depends on the size of the map region specified and the angle and scale tolerance desired. Preferred embodiments have used 64, 128 and 256 dimensioned Feature Vectors. A rough graphical depiction of a typical Feature Template in a facial recognition context is set forth at FIG. 18. The ordinal values of the bricks are not shown in FIG. 18. The bricks shown in FIG. 18 are those bricks whose "distinctiveness" is above threshold and which are actually part of a 64 dimensioned Feature Vector used in a preferred embodiment.

MURAL NETWORK SUBSYSTEM 280

The Neural Network Subsystem 280 takes as its input the Feature Vector 270 from the Feature Extraction Subsystem 250.

CONTENT BASED CLUSTER ADDRESSING SUBSYSTEM 750

A part of the feature vector for a given image is used to tell the system as to which cluster in which it is likely to reside. The feature vector is obtained 270 and the appropriate cluster is recalled 255. The steps in the process are:

a) The first term or pair of terms is resolved into not fewer than 10 levels of magnitude.

b) The first term or pair of terms determines which branch of a tree structure the object falls, and each succeeding term or pair of terms determines which subbranch of the main branch it falls.

c) Each term or pair of terms is thus similar to that of other objects in the database.

d) The population of objects within the same address is defined to be a cluster of similar objects.

e) When the population of a cluster exceeds a predetermined limit (200 in the preferred embodiment) the next term or pair of terms in the feature vector are used to reorder the individual into the next subbranch.

f) If a given objects feature address is ambiguous between two clusters, it can be placed in both.

g) Thus for example, if ten levels of discrimination are used on each of the first five points or pairs of adjacent points of the feature vector, a hierarchy of ten main branches will produce a tree with 100,000 clusters of 200 objects per cluster, covering a total population of 20 million objects.

The above process is believed valid for all types of objects, as long as only the same class of object is used, and no data base includes different types of objects in the same cluster structure. The number, content, and partition of those components is set to provide sufficiently reliable addressing of 200-element clusters over large databases. Alternatively, clustering could be performed manually using as criteria such factors as sex, race, height, weight and the like in the case of human facial image clustering.

NEURAL NETWORK SEARCH SUBSYSTEM 760

The neural network has two hidden layers, the first ("HL-1") being roughly half the size of the input layer ("IL"), and the second ("HL-2") being roughly half the size of the output layer ("OL"). In a preferred embodiment of the present invention IL=64, OL=100, HL1=20, and HL2=35. After loading the neural network weights and cluster data 790 (FIG. 15), the neural network is searched with standard neural network techniques by applying the Query Feature Vector-S00 using the neural network structures and weights.

NEURAL NETWORK STRUCTURE 770

The Structure of the neural network is kept in net files. Those files contain: (1) The total number of nodes (units) in the network (IL+HL1+HL2+OL); (2) The number of input nodes (equal to the dimension of the feature vector, IL); (3) The number of output nodes (equal to the number of individuals in the database, OL); and (4) The network connectivity described by a series of block descriptions containing:

(a) The index of the first receiving block;

(b) The number of receiving units in the block;

(c) The index of the first sending unit in the block;

(d) The number of sending units in the block; and (e) The network biases described by a series of block descriptions containing:

(i) the index of the first unit in the block; and (ii) the number of units in the block.

The network connectivity is a specification of which nodes are connected to which other nodes. The connectivity for the network of a preferred embodiment is such that the nodes may be arranged in a simple order of alternating receiving and sending groups or blocks, each node in a receiving block is connected to each node in the subsequent sending block. The "biases" are the additive terms in the transfer function.

NEURAL NETWORK WEIGHTS 780

The Set of weights for the neural network are kept in weight files. Those files contain:

The starting pattern column the number of items in a column the step or grain for processing patterns set of weights by column order the set of biases the set identifiers for the output units the mean vectors of training (arithmatic average of the feature vectors of the training set)

the Standard deviation vectors of training (arithmatic standard deviation of feature vectors of the training set)

and the rank vectors (vector which contains the ranking of the feature components by importance, i.e., weight). The content of the neural network output ks a vector of floating point numbers between 0.0 and 1.0, each component of which is associated with one output unit. In the Access Control Application, the search outputs of the neural network are passed to the Identification Subsystem 810. This step is not taken in applications requiring simple ranked output.

IDENTIFICATION SUBSYSTEM 810

The Identification Subsystem 810 subjects the neural network output values to standard Chi-squared confidence tests. These determine the "closeness" of an applied Query Feature Vector to the existing data from the stored (trained) Feature Vectors. The output values are compared for closeness of a Chi-squared fit for all individuals in the cluster, and a confidence level test performed for all individuals for closeness of fit to the measured output. A rank ordered confidence level list is produced. Recognition is determined by setting thresholds on minimal confidence level for individual identification, and rejection of all others by setting maximum confidence level thresholds on all remaining individuals. Typically applied rules include for example that a successful and unique identification results when one individual has a confidence level fit above 99%, with no other individual rising above 5%.

OUTPUT CONTROL SUBSYSTEM 820

The Neural Network Output Control Subsystem 820 outputs a 32 bit unique identifier number 830. If there was no successful identification, that number is 0 (840).

NEURAL NETWORK TRAINING SUBSYSTEM 850

The neural network weights and cluster data for the appropriate cluster are loaded from memory 860. The additional Feature Vector 270 and related data is added to the file of feature vectors kept for training purposes 870. That file contains the number of components in the feature vector, the number of feature vectors, a list of feature vectors composed of identification text and feature vector values.

BACKWARD ERROR PROPAGATION TRAINING SUBSYSTEM 880

The neural network is then trained with a modified backward error propagation or Back Propagation Network 880. Back Propagation is a supervised learning paradigm based on a steepest descent method of computing the interconnection weights which minimize the total squared output error over a set of input Feature Vectors. The outputs generated by the neural network for a given Input Feature Vector are compared with desired outputs. Errors are computed from the differences, and the weights are changed in response to such error differences in order to reduce this difference. The Back Propagation Network learns a mapping function of weights by having the Input Feature Vectors repeatedly presented in the training set and adjusting the weights until some minimal total error for all examples is reached. The activation of each unit in the hidden 1190, 1200 and output 1210 layers is computed by a sigmoid activation function:

$$\sigma_i = \frac{1}{1 + e^{-\tau_i}} \quad (5)$$

where $\sigma_i$ is the activation for unit i, and $\tau_i$ is:

$$\tau_i = \theta_i + \Sigma_j \omega_{ij} \sigma_j \quad (6)$$

with $\theta_i$ the bias for unit i, and $\omega_{ij}$ the weight matrix between node j and node i. The steepest descent method guarantees convergence of the total RMS error to some value. The total RMS error is:

$$\Delta = \frac{1}{PU} \sqrt{\Sigma_p \Sigma_i \delta^2} \quad (7)$$

with A the total RMS error, and $\delta$ the difference between the desired and calculated outputs for pattern p with total patterns P, and output unit i with total units U.

However, gradient descent to a solution is only guaranteed if infinitesimal changes are made to the weights. Since this is impractical on a computation engine, the maximal weight change is set as a learning rate ($\eta$). If it is set too high, the RMS error oscillates. If set too low, the system takes too long to converge. The optimal value of $\eta$ depends on the shape of the error function in weight space. In a preferred embodiment, an $\eta$ value of 1 has been used.

The learning rate ($\eta$) may be increased without oscillation by adding a momentum term (e). The momentum term determines what portion of the previous weight changes will be added to the current weight adjustment. The weight change equation thus is:

$$\Delta \omega_{ij}(t+1) = \eta(\delta_i \sigma_j) + \alpha \Delta \omega_{ij}(t) \quad (8)$$

Each layer weight matrix may have its own learning and momentum terms.

Figure 21:
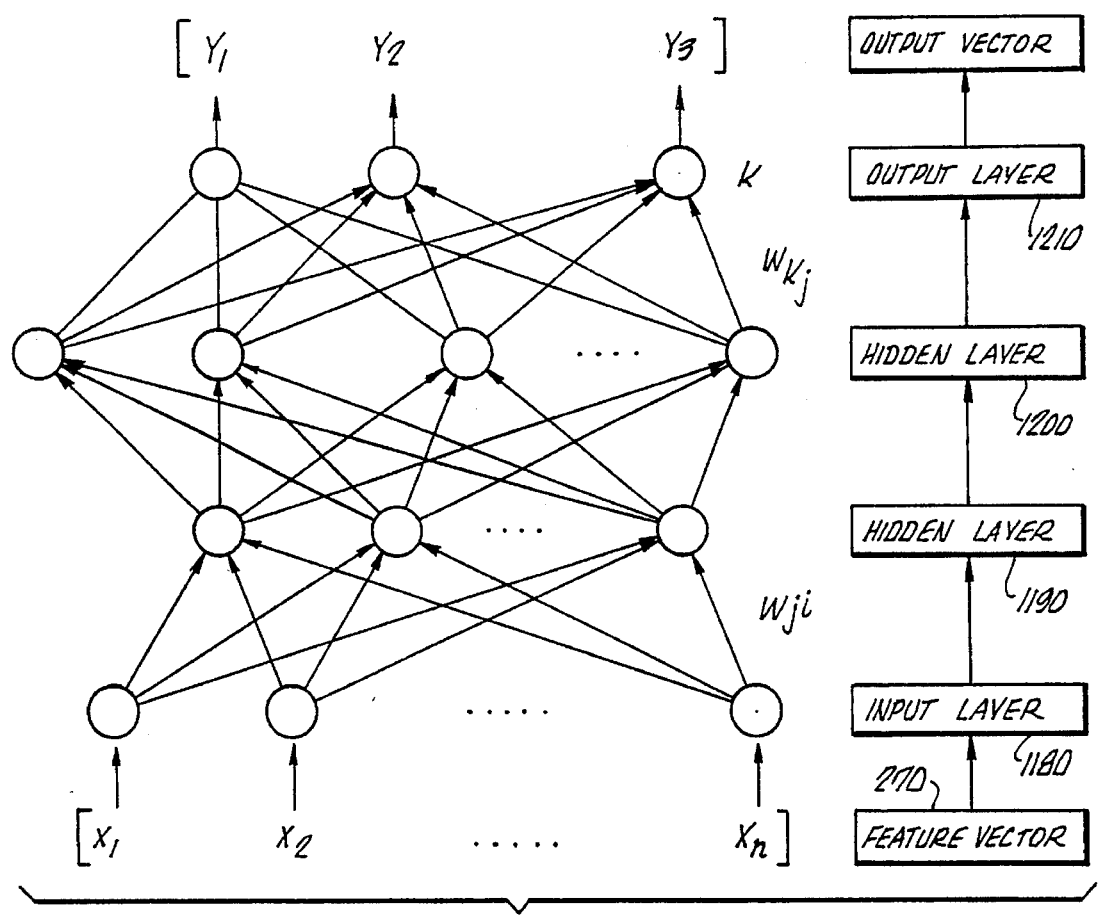
FIG. 21 is a schematic diagram of the neural network structure.

In a preferred embodiment, a modified gradient descent is used where the weights are changed after each cycle and extra cycles are added only for outriders thus permitting gradient descent along the outriders' steepest line of descent. In more detail, referring to FIG. 21, the input feature vectors 270 are fed into the nodes in layer i. The output of nodes in the input layer, $O_i$ (1180), is simply the feature value $x_i$. The net input to a node in layer j is:

$$net_j = \Sigma_i \omega_{ji} O_i \quad (1°)$$

and the output of a node in layer j is:

$$O_j = f_a(net_j) \quad (2°)$$

where $f_a(°)$ is the activation function. Using a sigmoid activation function, $$O_j = \frac{1}{1 + e^{-(net_j + \theta_j)}} \quad (3°)$$

For nodes in layer k, the input to each node is:

$$net_k = \Sigma_j \omega_{kj} O_j \quad (4°)$$

and the output of which is $$O_k = f_a(net_k) \quad (5°)$$

Equations (1°), (2°), (3°), (4°) and (5°) constitute the set of operations in a forward propagation pass in which an input vector is presented and the set of equations evaluate to a set of output values (of the output layer) $O_k$.

The implementation of a neural network described herein is a fully connected network (FIG. 21) with (1°), (2°), (3°), (4°) and (5°) implemented for forward propagations in the training mode and in the recognition mode.

Equation (3°) implements a sigmoid function as the activation function. It turns out that the derivative of this is also required in training, as discussed below. This derivative, $$\frac{d f_a(net_j)}{d(net_j)}$$

is simply $$\frac{d}{d(net_j)} \left\{ \frac{1}{1 + e^{-(net_j + \theta_j)}} \right\} = O_j(1 - O_j) \quad (6°)$$

$\overline{X}_p$ is a training vector presented to the input of a multi-layer perceptron. The desire is to find a way to systematically modify the weights in the various layers such that the multi-layer network can "learn" the associations between the various training vectors and their respective class labels.

In general, given input $\overline{X}_p$, the outputs $[O_{p1}, O_{p2}, \ldots O_{pk} \ldots]$ will not be the same as the desired outputs $[t_{p1}, t_{p2}, \ldots t_{pk} \ldots]$. The sum-of-squared-error is $$\epsilon_p = \frac{1}{2} \Sigma_k (t_{pk} - O_{pk})^2 \quad (7°)$$

For the entire training set $\{\overline{X}_1, \overline{X}_2, \ldots \overline{X}_q\}$, the average system error is simply:

$$\overline{\epsilon}_q = \frac{1}{2q} \Sigma[\Sigma_k (t_{pk} - O_{pk})^2] \quad (8°)$$

The training rule, well known now as Back Propagation Training, is to minimize the above error function with systematic modification of the weights. It has a gradient descent interpretation and is sometimes called the Generalized Delta Rule, when viewed as a generalization of the Widrow-Hoff Delta Rule (Least Mean Square procedure). For convenience drop the subscript p from Equation (7°):

$$\epsilon = \frac{1}{2} \Sigma_k (t_k - O_k)^2 \quad (9°)$$

To modify the weights, proceed so that the error $$\epsilon = \frac{1}{2} \Sigma_k (t_k - O_k)^2 \quad (10°)$$

is decreased as much as possible in each iteration. This is achieved by modifying $\omega_{kj}$ such that $$\Delta \omega_{kj} = -\eta \frac{\partial \epsilon}{\partial \omega_{kj}} \quad (11)$$

where $\eta$ is the step size. Simplifying, $$\Delta \omega_{kj} = -\eta \frac{\partial \epsilon}{\partial net_k} \cdot \frac{\partial net_n}{\partial \omega_{kj}} \quad (12)$$

$$= -\eta \frac{\partial \epsilon}{\partial net_n} \cdot \frac{\partial (\Sigma \omega_{kj} O_j)}{\partial \omega_{kj}} \quad (13)$$

$$= -\eta \frac{\partial \epsilon}{\partial net_k} \cdot O_j \quad (14)$$

$$\frac{-\partial \epsilon}{\partial net_k}$$

needs to be evaluated, rewriting it, $$\frac{-\partial \epsilon}{\partial net_k} = \frac{\partial \epsilon}{\partial O_k} \cdot \frac{\partial O_k}{\partial net_k} \quad (15)$$

$$\frac{\partial \epsilon}{\partial O_k} = -(t_k - O_k) \text{ and } \frac{\partial O_k}{\partial net_k} = f_a'(net_k) \quad (16)$$

$$\frac{-\partial \epsilon}{\partial net_k} = (t_k - O_k) f_a'(net_k) \quad (17)$$

The derivative of the activation needs to be evaluated, using (6°):

$$\Delta \omega_{kj} = -\eta \frac{\partial \epsilon}{\partial net_k} \cdot O_j \quad (18)$$

$$= \eta(t_k - O_k) f_a'(net_n) O_j \quad (19)$$

For any output layer node k, the expression above provides the weight modification procedure. However, for weights not directly affecting the output nodes, the situation differs. Proceeding as before, $$\Delta \omega_{kj} = -\eta \frac{\partial \epsilon}{\partial \omega_{ji}} \quad (20)$$

$$= -\eta \frac{\partial \epsilon}{\partial net_j} \cdot \frac{\partial net_j}{\partial \omega_{ji}} \quad (21)$$

-continued $$= -\eta \frac{\partial \epsilon}{\partial net_j} O_i \quad (22)$$

$$= +\eta \left[ \frac{-\partial \epsilon}{\partial O_i} \frac{\partial O_i}{\partial net_j} \right] O_i \quad (23)$$

$$= \eta \left[ \frac{-\partial \epsilon}{\partial O_j} \right] f_a'(net_j) O_i \quad (24)$$

$\frac{-\partial \epsilon}{\partial O_j}$ needs to be evaluated as before, but it cannot be evaluated directly since it is not at the output layer. Instead, $$\frac{-\partial \epsilon}{\partial O_j} = -\Sigma_k \frac{\partial \epsilon}{\partial net_k} \cdot \frac{\partial net_k}{\partial O_j} \quad (25)$$

$$= \Sigma_k \left[ \frac{-\partial \epsilon}{\partial net_k} \right] \frac{\partial}{\partial O_j} \Sigma_r W_{kr} O_r \quad (26)$$

$$= \Sigma_k \left[ \frac{-\partial \epsilon}{\partial net_k} \right] W_{kj} \quad (27)$$

For inner layers:

$$\Delta \omega_{ji} = \eta \left[ \Sigma_k \left[ \frac{-\partial \epsilon}{\partial net_k} \right] W_{kj} \right] f_a'(net_j) O_i \quad (28)$$

Evaluation of $$\left[ \Sigma_k \left[ \frac{-\partial \epsilon}{\partial net_k} \right] W_{kj} \right] \cdot f_a'(net_j)$$

requires the error derivative term from the next layer closer to the output layer. In a sense, the "errors" information is propagated backwards from the output layer, and used for modification of weights, while the input training pattern is fed forward from the input to the output layer.

Summarizing, given training pattern $\overline{X}_p$, the weight modification scheme is:

$$\Delta_p \omega_{ji} = \eta \delta_{pj} O_{pj}, \text{ where} \quad (9°)$$

for j nodes being output layer nodes, $$\delta_{pj} \triangleq (t_{pi} - Ohd \, pj) f_a'(net_{pj}), \text{ and} \quad (10°)$$

for j nodes being non-output layer nodes, $$\delta_{pj} \triangleq (\Sigma_k \delta_{pk} \omega_{kj}) f_a'(net_{pj}) \quad (11°)$$

Equations (9°), (10°) and (11°) constitute the set of operations in a backward propagation pass in which the weights are modified accordingly. The above backward propagation pass has been implemented in a preferred embodiment with (9®) modified to be $$\Delta_p \omega_{ji}(n+1) = \eta \delta_{pj} O_{pj} + \alpha \Delta \omega_{ji}(n) \quad (12°)$$

where n indexes the presentation number and $\alpha$ is a constant determining the effect of past weight changes on the current direction of movement.

In addition during training if the error term fails to converge to a small value and outriders are detected 890, extra training cycles 900 are added to those outriders. The system tracks the convergence of each member of the training set of feature vectors. When the error term for a member of the training set fails to converge to a similarly small value as the other members of the training set, that member is an "outrider". The addition of extra training cycles for that member of the training set further converges its error term and brings it into line with the error terms of the rest of the training set.

OUTPUT CONTROL SUBSYSTEM 820

The output control subsystem 820 will output to memory a weight file 780 described above and indicate the success or failure of the training process 910.

FEATURE TEMPLATE GENERATION SUBSYSTEM 240

The Feature Template Generation Subsystem 240 extracts Fourier frequency domain feature components to construct a "feature map" useful for pattern discrimination between objects belonging to various classes of interest.

Successful pattern recognition depends on selecting the appropriate set of feature components. Ideal (maximally distinctive) features should: (1) contain sufficient between-class discrimination information for accurate classification (2) retain enough within-class information to tolerate within class pattern variations; and (3) provide little or no overlap information between each selected component.

Assume that for each object of interest there are one or more images. Images of the same object will not be identical. The difference will result in the in class variations between the feature vectors derived from them.

The Feature Template Generation Subsystem 240 accomplishes the above, taking practical constraints into consideration. To achieve good classification results, the frequency components showing high out-of-class variation accompanied by a simultaneous low within class variation will be selected. To capture enough within class information, the frequency components within local regions in the feature space are averaged to provide robustness towards in-class variations. Too much averaging dilutes the discriminating information buried in certain key components. Correlation between the various components will always exist and is difficult to eliminate. Decorrelation of the features will not be required as long as the number of features derived to satisfy criteria (1) and (2) (above) is not too large for machine implementation. As discussed briefly above, the Feature Template Generation Subsystem 240 compares the images and performs an in-class to out-of-class study similar to the Rayleigh Quotient of the accumulated FFT data for the entire population.

There are two basic ways of calculating the average Out-class and In-class power spectrums.

The first method is to use the absolute difference between power spectrums as a measure of their difference:

Let $X_{ij}$ represent the power spectrum of the $i^{th}$ individual's $j^{th}$ view, where i=0, 1, 2, ... (n–1)

j=0, 1, 2, ... (m–1)

The average Out-Class Difference t the average absolute difference between power spectrums of different individuals for each of the views=

$$[\Sigma_{j=0}^{m-1} [\Sigma_{i=0}^{n-2} [\Sigma_{i'=i+1}^{n-1} |X_{ij} - X_{i'j}|]]] \div \left[ \frac{mn(n-1)}{2} \right] \quad (29)$$

The average in-class difference=the average absolute difference between power spectrums for different views of each of the individuals=

$$[\Sigma_{i=0}^{n-1}[\Sigma_{j=0}^{m-2}[\Sigma_{j'=j+1}^{m-1}|X_{ij}-X_{ij'}|]]]\div\left[\frac{nm(m-1)}{2}\right] \quad (30)$$

So the portions of the power spectrum that have the most discriminating information will be given by the ratio of the average out-class difference to the average in-class difference t Average Out-Class Difference/Average In-Class Difference The <u>second</u> method is to use the variance between power spectrums as a measure of their difference:

Let $X_{ij}$ represent the power spectrum of the $i^{th}$ individual's $j^{th}$ view, where i=0, 1, 2, . . . (n−1)

j=0, 1, 2, . . . (m−1)

The Average Out-Class Variance:

For each view calculate the mean power spectrum of all individuals and then the average squared deviation of each individual from this mean=

$$\frac{1}{m}\left[\Sigma_{j=0}^{m-1}\frac{1}{n}\left[\Sigma_{i=0}^{n-1}\left[X_{ij}-\frac{1}{n}\Sigma_{i'=0}^{n-1}X_{i'j}\right]^2\right]\right] \quad (31)$$

The Average In-Class Variance:

For each individual calculate the mean power spectrum of all views and then the average squared deviation of each view from this mean=

$$\frac{1}{n}\left[\Sigma_{i=0}^{n-1}\frac{1}{m}\left[\Sigma_{j=0}^{m-1}\left[X_{ij}-\frac{1}{m}\Sigma_{j'=0}^{m-1}X_{ij'}\right]^2\right]\right] \quad (32)$$

So the portions of the power spectrum that have the most discriminating information will be given by the ratio of the average out-class variance to the average in-class variance= Average Out-Class Variance/Average In-Class Variance.

DATA

A collection of images is assembled which is representative of the class of images to which the system application is targeted.

IMAGE PROCESSING

The Image processing of this image data is identical to that outlined in the Image Processing Subsystem 330.

TEMPLATE EXTRACTION

Figure 11:
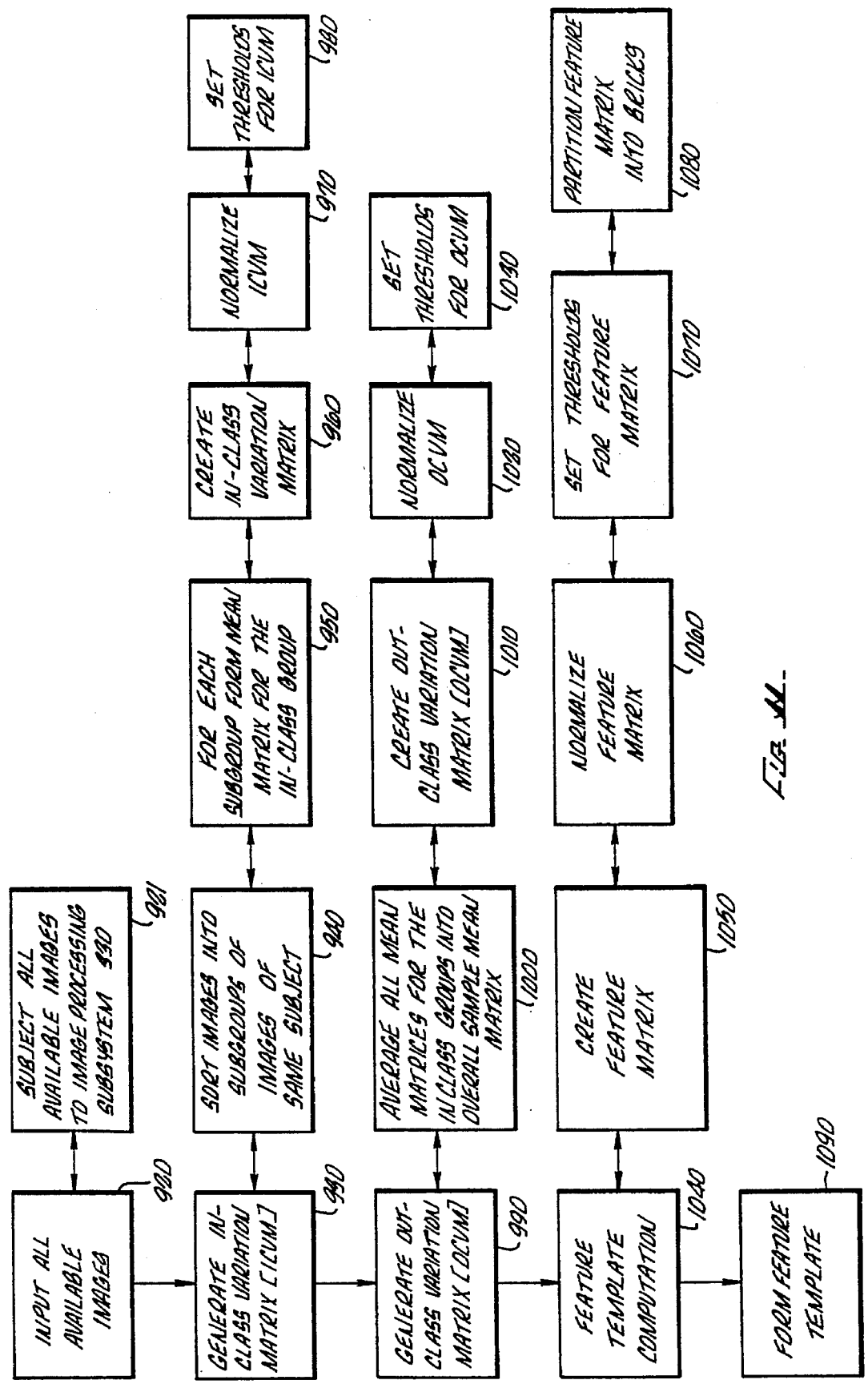
FIG. 11 is a block diagram of the Feature Template Generation Subsystem according to a preferred embodiment of the pattern recognition system of the present invention.
Figure 13:
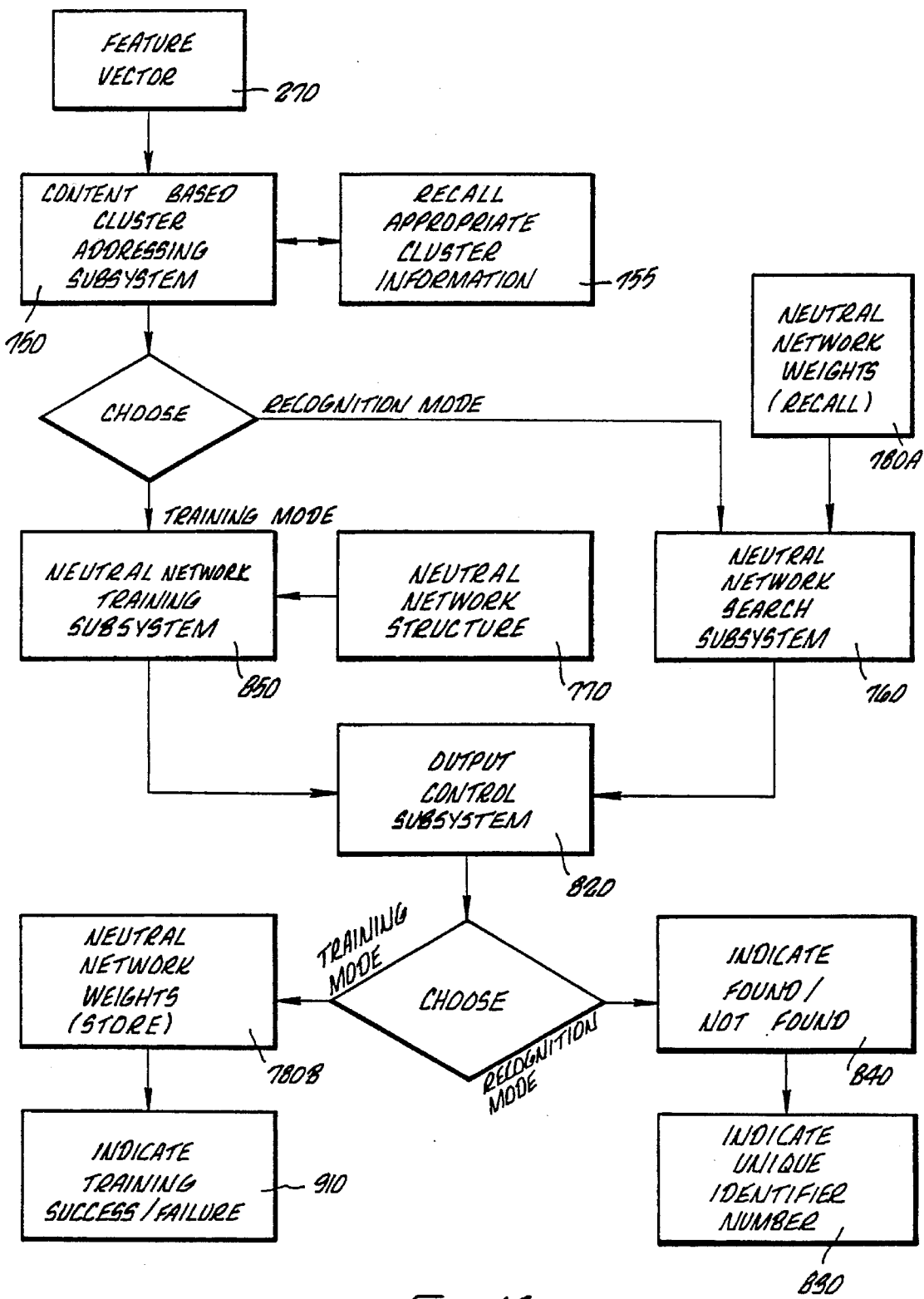
FIG. 13 is a block diagram of the Neural Network Subsystem and Output Control Subsystem according to a preferred embodiment of the pattern recognition system of the present invention.

A 2-dimensional Fourier transformation will be performed on each image to obtain the power spectrum of the image. The entire power spectrum is then divided by the maximum power spectrum value. The normalization removes, to a certain extent, the variation in the illumination component of lighting. It is then scaled to be within the 0.0 to 255.0 intensity range for display purposes. All available images are preferably input 920 (FIG. 11) to the Feature Template Generation Subsystem 240 and processed as before 921.

GENERATE IN-CLASS VARIATION MATRIX 930

The image data is sorted into subgroups 940. Each subgroup consists of images of the same subject.

METHOD 1:

All the matrices representing the 128×128 valued power spectrum are then averaged yielding a mean matrix for the In-Class group 950. The mean component by component deviation from that matrix is then calculated and the mean deviation matrices of all individual In-classes is then averaged. The resultant matrix is the In-Class Variation Matrix 960.

METHOD 2:

An alternative method: The mean absolute pair-wise component by component difference of the matrices of all members of the In-Class subgroup is calculated and the mean deviation matrices of all individual In-classes is then averaged. The resultant matrix is the In-Class Variation Matrix 960.

GENERATE OUT-CLASS VARIATION MATRIX 990

METHOD 1:

All the mean matrices for the In-Class groups are averaged yielding an overall sample mean matrix 1000. The mean component by component deviation from that sample mean matrix is then computed 1010 and that result is the Out-Class Variation Matrix.

METHOD 2:

An alternative method: The mean absolute pair-wise component by component difference of the mean matrices of the In-Class subgroups is calculated and that is the Out-Class Variation Matrix.

1. The feature vector of a given example is stored in a file of feature vectors for the cluster of individuals to be trained on.

2. When all individuals and their examples are entered for training, a modified back-propagation neural network algorithm i used to iteratively train on all examples. The system is self monitoring and attempts to fit all individuals into a space which results in the right ID code to be output when the neural network weights have been adjusted properly for all candidates. This is an iterative feedback procedure, whereby the total output error (deviation from the right ID output code) is monitored and an attempt is made to reduce it to zero. The system considers itself trained when a residual error (which may be manually set) is reached. The residual error is the RMS total error as previously defined. It says that the sum of all differences between calculated outputs and desired outputs in the training set are below some total sum, which can be arbitrarily set. A low error says that operating on all examples in the training set with the network weights produces calculated outputs which are close to the designated outputs In a novel application of back propagation networks, during the training sequence, the error for each individual is known, and any candidates which do not converge as rapidly as the rest ("outriders") are individually recycled through the process extra times. Any candidates who do not converge to a solution are identified and excluded from the training sample, with an opportunity for the operator to correct any input errors prior to retraining or exclusion. This can occur, for instance, when two or more individuals are assigned the same PIN, or different examples of a single individual are assigned different PINs, or Input Feature Vectors are somehow corrupted.

3. The final network weights for a given cluster are saved and identified as a particular cluster for later access in recognition.

FREQUENCY COMPONENT WEEDING

The Out-Class Variation Matrix is normalized 1020 against its largest component (maxima). All components of that matrix smaller than a lower discrimination threshold are discarded 1030 (set to zero).

The In-Class Variation Matrix is normalized by division by its smallest non-zero component 970. All components greater than an upper discrimination threshold are discarded (set to zero) 980.

FEATURE TEMPLATE COMPUTATION 1040

For each instance where the corresponding components of the In-Class Variation matrix and the Out-Class Variation matrix are BOTH non-zero, we then divide the Out-Class component by the corresponding In-Class component and enter that in the Feature Matrix 1050. If either component is zero, zero is entered into the Feature Matrix. The Feature Matrix is Normalized 1060. Then all components of the Feature Matrix which fall below the feature threshold are set to zero 1070.

For each of the remaining components after the feature reduction, a ratio out-of-class variation to in-class variation is computed. In the case, only a single in-class sample is available, this ratio will not be available. The ratio computation, will be replaced, by simply normalizing the out-class variation by the average value of the respective power spectrum component. This ratio can be interpreted as the percentage standard deviation of the various spectral components.

By setting a threshold on the ratio, the frequency components which should be retained in the feature template are determined. Low out-class variation to in-class variation ratio signifies a low quality component and therefore should be eliminated. Since in a preferred embodiment of the present invention only 128 bricks will be used, eliminating the lower ordered bricks serves to reduce the computational complexity of the problem but does not affect the result.

The Feature matrix is then treated as a Fourier 2-space and partitioned by an orthogonal coordinate system into regions or bricks 1080. The components within each brick are averaged. In effect, a grid partitioned by radial lines and concentric circles will now be imposed onto the components in the frequency domain. This partitioning can be adjusted, giving different tolerances to scaling and rotational invariance. The larger each partition is, the more invariance will be obtained at he expense of increased dilution of the information contained. Each partition is called a "brick" in the frequency domain.

For each brick above the threshold, the components within it will be averaged to yield one component in the feature vector. The averaging provides invariance to small angle rotations and scaling.

The components are finally sorted according to the out-class to in-class ratio, permitting the discarding of the lower quality components. The out-class to in-class ratio for each brick is obtained as the average value of the ratios associated with all the points in the brick.

For each component, the values are being normalized to zero mean and then normalized so that a two standard deviation variation falls within he numerical range of –0.5 to +0.5. The feature vectors are now ready to be fed to the neural network.

A Feature Template Vector is then defined 1090 and a fixed allotment assigned to the Fourier space domain. That allotment is filled with the links to the Fourier region corresponding to component. All other Fourier components are discarded.

This Feature Template is then preserved for this target application in a feature template file. The file contains: (1) the FFT size; (2) the number of components; (3) the number of bricks by quadrant only the lower two quadrants are used because of symmetry); (4) for each brick the number of FFT elements in the brick, an index, the number of points in the brick, and an index of the points in the brick.

THE DETERMINATION OF THRESHOLDS

The Upper and Lower Discrimination and the Feature thresholds are provided for computational simplification. They are to be chosen so that there is, on one hand, sufficient numbers of non-zero Feature Matrix components to provide enough bricks to fill the feature template at the output of this system, and, on the other hand, to eliminate the need to compute components of the feature matrix which will later be discarded. Within those constraints, all choices of thresholds should produce identical results. A failure to set thresholds will simply increase the computational complexity of the problem while not resulting in a different outcome.

THE DETERMINATION OF FEATURE SPACE PARTITION

The feature space partition provides a mechanism for mapping the available Fourier space to limited memory and computational resources and provides a way to tolerate small scaling and rotational variances. We have determined that, without other angular correction strategies, a brick width of 5 degrees provides suitable robustness for facial applications while providing minimum coverage of the FFT data area. The brick height provides depth of field tolerance for subjects of about 10 percent and varies along the radial axis by the following relationship.

Turning to FIGS. 19 and 20, the template or mask is specified in terms of rings 1100, 1110 and wedges 1120. A ring 1100 is the area between two circular arcs 1130, 1140. The thickness of each ring depends on the percentage of scale invariance specified and this thickness decreases as we near the origin. Each ring in turn is divided into many wedges 1120. The number of wedges in a ring and the angular width of each wedge is determined by the percentage of rotational invariance specified and are the same for each ring. A ring need not extend all the way from −180 to +180. There can be gaps as exemplified by FIGS. 18 and 19.

The ring/wedge data file contains the number of rings. For each ring the following information is present: The average radius of the ring 1150 (see FIG. 20) and the number of wedges in the ring.

For each wedge, the following information is present: The average angles of the wedges 1160, 1170 relative to the origin (see FIG. 20) and the number of points in the wedge. For each point in the wedge its X and Y coordinates are specified.

The rings are defined as follows:

A series of rings on the two-dimensional real space is defined such that every point in a ring is within a given variance, p, of the median radius of the ring, and such that the outer boundary of the outermost ring equals R.

Let $r_i$ be the mean radius of the i-th ring and $I_i$ and $O_i$ represent the Inner and Outer radii respectively. Let the O-th ring be the outermost, i.e. counting the rings outside to inside. This is done because the rings converge asymptotically to zero, so there is no ring nearest the origin.

To keep all the points within the variance, $$I_i = r_i(1-p) \quad (33)$$

$$O_i = r_i(1+p) \quad (34)$$

and thus $$I_i/O_i = (1-p)/(1+p) \quad (35)$$

where $0 < p < 1$.
Thus:

$$O_i = R\,((1-p)/(1+p))^i \quad \text{Outer radius} \quad (36)$$

$$I_i = R\,((1-p)/(1+p))^{(i-1)} \quad \text{Inner radius} \quad (37)$$

$$r_i = R\,(1-p)^{(i-1)}/(1+p)^i \quad \text{Mean radius} \quad (38)$$

II. APPLICATIONS

A. FACIAL RECOGNITION

The system has the capability of serving a number of different applications without further modification. These include:

Facility Access Control: Restriction of access to facilities and/or equipment.

Traffic Flow Monitoring: Monitoring human traffic flow for particular individuals.

Identity Verification: Positive verification of facial identity against passport, driver's license, ID badge and/or verbal self-identification.

Criminal Activity: Monitoring of thoroughfares for known criminals such as bank robbers at banks, terrorists at airports, foreign agents and drug dealers at ports of entry.

Remote Monitoring: Seeking out threats to public safety in gatherings or crowds.

Criminal Files: Searching out criminal candidates in "mug-shot" files from artist composites and photographs.

1. Access Control Application

The PARES can be used in, for example, an access control application. The system could be trained to recognize "authorized" people. Simple black and white cameras can be used to photographically image access points. The system will recognize the individuals previously trained into the database whenever they enter the camera field of view. Individuals not included in the training database will be ignored or identified as unknown. The system attributes a confidence level to each positive recognition, and in rare cases of ambiguity, can request assistance from a human operator. The system can produce an active output which can open a door, trigger an alarm, or record the transaction with both digital and visual records. The system will recognize individuals previously trained on without requiring posing in front of the camera, and can accommodate normal and natural changes such as day to day changes in hair styles, beards and mustaches, glasses, makeup, aging, and a range of "theatrical" type disguises. Many modifications are possible to accommodate specific needs as would be clear to those of skill in the art. Additional security would be achieved by physically separating the training and recognition portions of the PARES so as to restrict access to the training portion and prevent unauthorized retraining. To this end, calibration images in the system can be used to detect minor corruption of the trained neural network data.

The system has several advantages. It is entirely non-intrusive and does not require individual active participation for successful recognition. It operates in near real-time, permitting use in high traffic flow applications. It recognizes human faces rather than artifacts the individual may carry, such as badges, providing a higher degree of control in high security environments than present systems. Recognition modules may be operated independently or coupled together over standard communications lines for large database, dispersed or integrated access points. The system requires no specialized operator knowledge to operate. It can be configured to monitor for specific and unique security requirements such as "two-man rules" time periods and durations permitted for individual access, and rules for visual logging of successful and unsuccessful access attempts. The system may be used as a stand-alone recognition system or as an identity verification device in conjunction with other security devices. The system can be placed into a portable configuration permitting remote surveillance and monitoring.

2. Identity Verification Application

The second is used to verify the identity of an individual, and consists of two modes:

a) Cooperative assistance by the individual in providing other forms of ID such as PIN codes, badges, fingerprints etc., to verify identity.

(b) Checking of an individual's identity to assure that he is not in the database under other names or ID. This is useful in the generation of ID badges, drivers licenses, mug-shots and criminal bookings, and prison or other controlled access facilities.

3. Mug Shot Identification Application

This application is much like those above. For example, an agent has a photograph and wishes to determine if the subject of the photograph is in the database. The photograph is digitized into an input image above, a query feature vector is formed and applied to the neural net. The correct cluster is called up and an attempt made to match the query image to the data in the database. The result is indicated to the operator.

B. NON-FACIAL PHOTOGRAPHIC RECOGNITION

1. Footprint Identification Application

The approach to setting PARES up for footprint identification is much the same as for facial images. Some additional difficulties are presented. For example, the surface on which the footprint is imprinted is usually non-smooth and textured itself, causing the footprint to be somewhat distorted and marred by noise patterns.

The texture elements of footprints tend to be somewhat periodic and directional, giving signatures as peaks in the spatial frequency domain. Using the Fourier power spectrum as classification features comes quite natural for the problem.

The frequency power spectral components are rotational and scaling variant. The rotational variance can be handled by presenting the unknown sample at various angles to attempt matches. The scaling variance is more difficult to deal with for samples of undetermined size. Where this is a problem, a close relative to the Fourier transform, the Mellin transform, has the property of being scaling invariant.

Grainy random artifacts have a much smaller size compared to the texture element sizes. They can be removed in the spatial domain using a small kernel median filter. They are characterized by a spatial frequency very much higher than the texture elements. So the alternative approach is to annihilate them in the frequency domain.

Smearing artifacts are simply directional noises and seem to possess enough energy to show up prominently in the Fourier power spectrum. These can also be annihilated in the frequency domain.

Gradual, uneven shading running from one end of the textured surface to another can be reduced by removing the very low frequency components of the Fourier power spectrum.

An inverse transform is then performed to obtain a noise reduced image. The above process may have to be repeated until a satisfactory result is obtained, as image restoration is typically an educated trial-and-error process.

Morphological Operations are then applied to the image to smooth the outer contours of the texture elements. A combination of closing and opening with kernels of various sizes and shapes will be needed.

C. NON-IMAGE RECOGNITION

Any time varying analog signal input compatible with well known analog to digital conversion boards compatible with computers can be processed as described herein. Representative signals might include seismic traces, radar signals, voice, medical diagnostic signals such as EKG, EEG etc., and any other sensor signal. Any signal which has a periodicity or is bounded and limited in its content and which can be digitized so as to be stored in computer memory may be presented to the system with Input Feature Vectors generated by the mechanisms previously described, and operated on using the training and recognition techniques set forth herein. Since the system uses supervised learning techniques, the choice of system desired outputs can range from the identity of the object, to "good/bad" or "pass/fail" answers, independent of the type of input. The Feature Template mechanism guarantees maximal separability between objects in the same class, the Feature Vector extraction mechanism the optimal Input Feature Vector, and the recognition mechanism the closest fit to the desired result, with application dependent analysis of the resulting confidence levels. Thus, for the different applications cited, no system reprogramming is required for different applications.

Similarly, any digital time varying signal which can be captured in computer memory can be processed as described herein. This would include analog signals which are placed directly in computer memory using devices such as modems, or directly coupled digital information transferred through parallel or serial or high speed bus ports. Typical information of this type could include stock information, digital sensor output, and previously digitized information stored on digital media such as tape or disk.

III. OTHER TECHNIQUES FOR IMPROVED PERFORMANCE

A. GENERALIZATION USING DIFFERENCE VECTORS

A major concern in the design of any pattern classifier is the degree to which the classification system generalizes beyond the data actually used to train the classifier. Under ideal conditions, the classification system should be trained with input feature samples that span the distribution of all patterns that will potentially be encountered. For the face recognition problem, this is completely impractical—it means that the training database must consist of digitized face samples at many different acquisition geometries accounting for the expected range of tilt, yaw, and roll of the faces to be imaged in the operational mode. For some of the applications being considered for PARES, it is anticipated that only frontal, and perhaps profile, face views will be available for training (e.g. mugshots). Under these training conditions, there is a natural concern regarding the degree to which non-frontal and non-profile face acquisitions can be recognized (or rejected). In the following discussion, it is assumed that only frontal views will be available for "operational" faces. The ideas extend naturally to profile views, if available.

In order to provide improved generalization, a preferred embodiment of the present invention is to generate "synthetic" face data which is representative of face feature data that would be obtained for non-frontal acquisitions. These synthetic face samples are created directly in feature space and are used to augment the frontal face database during training.

The synthesis of these additional views requires the collection of a small database, S, of non-frontal face views for a wide variety of face types, but by no means a complete set. The faces selected for this analysis need not be elements in any of the eventual application databases. Feature vectors are calculated for each of these faces. Let $F_i(j)$ represent the feature set for individual i at acquisition angle j. These acquisition angles must span a range of yaw and tilt angles (roll can be simulated by planar image rotation). Let $F_i(0)$ represent the frontal view of individual i (i=1, ..., K).

For each of the K individuals in set S, a set of feature difference vectors is computed according to $$D_i = \{d_i(j) = F_i(j) - F_i(0); j=1, \ldots, N\} \quad (39)$$

where N is the number of non-frontal face views for each individual. Note that individual i's face feature set at angle j is then given by $F_i(j) = F_i(0) + d_i(j)$. This suggests a method of constructing a synthetic face image of a new individual m not contained in set S (i.e. m>K) by using the difference vectors from individuals that are contained in S. An estimate for individual m at angle j is given by $$F_m(j) = F_m(0) + d_k(j) \quad (40)$$

where $d_k(j)$ is a difference vector drawn from $D_k$ for some selected k<K or is a composite of difference vectors computed for angle j from all of the individuals in set S. Given only the frontal view of individual m, the vector $F_m(j)$ is an estimate of what that individual would "look like" in feature space at angle j.

The quality of the non-frontal face feature estimate depends on the degree to which $d_k(j)$ (or the composite difference vector) is representative of the difference vector for individual m. This, in turn, depends on the nature of the specific features used and the actual angular difference between the frontal view and the angle j view. This concept is depicted in FIG. 16 for two individuals. As the head turns away from frontal, the feature vector follows a trajectory through feature space.

For sufficiently small angular variations, this trajectory can be approximated by linear interpolation between different angular views. Given the set of difference vectors $D=\{D_i; i=1, \ldots, K\}$, and assuming that the linear approximation applies, a new feature vector, v, can be constructed by weighting the difference vector:

$$i\ v_m F_m(0) + \alpha d_k(j) \quad (41)$$

where $\alpha$ is a weighting parameter that specifies the distance along the trajectory from the frontal view towards the angle j view.

Augmentation of the training feature set is accomplished by random selection of difference vectors and random selection of e for each available frontal view. The training procedure is thus given by the following six steps:

1. Select a frontal view feature vector $F_i(0)$ for individual i.
2. Select a difference vector $d_k$. It is suggested that the set of difference vectors include a sampling of zero vectors (all elements=0) so that the available frontal view has adequate representation during training.
3. Select a value of $\alpha$. It is suggested that $\alpha$ be uniformly distributed on the interval $[0,\beta]$ where $\beta$ is less than one.
4. Generate a synthetic face feature vector $v = F_m(0) + \alpha d_k$.
5. Use v in place of $F_m(0)$ in training the classifier.
6. Repeat steps 1–5 iteratively for all individuals in the desired operational database.

This approach can be used to generate different training vectors on each iteration through the available frontal views or the designer can generate a fixed training set. The former approach is preferred in the interest of increased generalization.

The generalization procedure described here assumes that difference vectors are less variable across the general population than are the actual face feature vectors, and that the majority of the variability is captured in the frontal views from individual to individual. This is a reasonable assumption for small angular variations (angles from frontal less that 15 degrees). For larger angular variations, the generalization procedure will break down because linear interpolation no longer applies. In this case, however, it is possible to extend the difference vector concept using angular variations between two non-frontal views. To produce a synthetic view at angle k, consider the sum $$v=F_m(0)+d_n(j)+d_l(j,k) \quad (42)$$

where angle k is greater than angle j and $$d_l(j,k)=F_l(k)-F_l(j) \quad (43)$$

is the difference between two different angular views for individual 1. Composite difference vectors could also be computed for this case.

The use of composite vectors (say the average difference vector over the set S at angle j) limits the generality unless more than one composite is created from subsets of the individuals. An alternative method for enhancing the generality is to add random noise to each element of the feature vector. This converts each "static" vector into a distribution of samples. The distribution is determined by the distribution of the random noise and may not, therefor, adequately represent face data.

B. INCREASE THE NUMBER OF TRAINING VIEWS OF EACH INDIVIDUAL.

The purpose is twofold. As more training views are adopted, the region for each individual in the feature space gets defined better and thereby reduces false recognition. This will also help to achieve a better feature space template.

C. RAISE THE ACCEPTANCE THRESHOLD OF THE NEURAL NETWORK OUTPUT CELLS.

While it will certainly reduce the false alarm rate, it will also bring down, to some extent, the rate of successful recognition of the known individuals. To preserve a high recognition rate, it becomes even more important to increase the number of training view of each individual.

D. PRECLUSTERING.

Pre-cluster Feature Vector classes into k clusters such that each class belongs to one and only one cluster. In each cluster, use samples from the other (k–1) clusters as the samples in the "unknown" category. This reduces the feature space occupied by the known classes in that cluster and forces the neural network to create regions belonging to the "unknown" class.

E. ARTIFICIAL REGIONS.

Create artificial regions of 'unknown' class half way between the known classes in the feature space, where each is of an hyper-sphere having a radius smaller than any intra-class and interclass distance. This reduces the feature space occupied by the known classes and forces the neural network to create regions belonging to the "unknown" class.

While preferred embodiments and applications of this invention are disclosed herein, many variations are possible which remain within the concept and scope of the invention, and these variations would become apparent to one of ordinary skill in the art to which this invention pertains after perusal of this specification, the drawings and the claims herein. The invention, therefor, is not to be restricted except in the spirit of the appended claims.

What is claimed is:

1. A pattern recognition system, comprising:

first means for receiving a plurality of images and corresponding image identification information;

second means for processing said plurality of images into image information;

third means for determining the most distinctive aspects of said image information, said third means including means for performing an In-Class to Out-of-Class study including:
   means for generating an In-Class Variation Matrix;
   means for generating an Out-Class Variation Matrix;
   means for normalizing said In-Class Variation Matrix;
   means for normalizing said Out-Class Variation Matrix;
   means for generating a feature Matrix;
   means for normalizing said feature Matrix into a normalized feature Matrix;
   means for partitioninq said normalized feature Matrix into bricks;
   means for prioritizing said bricks, and
   means for creating a feature template vector whose elements correspond to a subset of said bricks;

fourth means for forming feature vectors of the magnitudes of said most distinctive aspects of said image information;

fifth means for storing said feature vectors, said fifth means including neural network processor means adapted to store said feature vectors;

sixth means for receiving a query image;

seventh means for generating a query feature vector from said query image;

eighth means for querying said fifth means to determine the most similar previously stored feature vectors to said query feature vector;

ninth means for outputting image identification information corresponding to the previously stored feature vector most similar to said query feature vector.

2. A pattern recognition system according to claim 1 further comprising
   means for outputting a signal indicative of whether any of said plurality of images are sufficiently similar to said query image.

3. A pattern recognition system according to claim 1 wherein said second means includes means for obtaining a two-dimensional linear transform of said plurality of images and further comprising means for outputting a signal indicative of whether any of said plurality of images are sufficiently similar to said query image.

4. A device for recognizing authorized persons, comprising:

first means for receiving at least one image and corresponding image identification information from each of a plurality of authorized persons;

second means for processing the images received by said first means into image information;

third means for determining the most distinctive aspects of said image information, said third means including means for performing an In-Class to Out-of-Class study including:
   means for generating an In-Class Variation Matrix;
   means for generating an Out-Class Variation Matrix;
   means for normalizing said In-Class Variation Matrix;
   means for normalizing said Out-Class Variation Matrix;
   means for generating a feature Matrix;
   means for normalizing said feature Matrix into a normalized feature Matrix;

means for partitioning said normalized feature Matrix into bricks;

means for prioritizing said bricks, and means for creating a feature template vector whose elements correspond to a subset of said bricks;

fourth means for forming feature vectors of the magnitudes of said most distinctive aspects of said image information;

fifth means for storing said feature vectors, said fifth means including neural network processor means adapted to store said feature vectors;

sixth means for receiving a query image of a potentially authorized person;

means for applying said query image to said fourth means to form a query feature vector corresponding to said query image;

seventh means for querying said fifth means to determine whether said query image is within a predetermined range of similarity to any of the images of said plurality of authorized persons;

eighth means, responsive to said seventh means, for outputting a signal indicative of whether said potentially authorized person is one of said plurality of authorized persons.

5. A device for recognizing the simultaneous presence of a plurality of authorized persons, comprising:

first means for receiving at least one image and corresponding image identification information from each of a plurality of authorized persons;

second means for processing said at least one image received by said first means into image information;

third means for determining the most distinctive aspects of said image information, said third means including means for performing an In-Class to Out-of-Class study including:

means for generating an In-Class Variation Matrix;

means for generating an Out-Class Variation Matrix;

means for normalizing said In-Class Variation Matrix;

means for normalizing said Out-Class Variation Matrix;

means for generating a feature Matrix;

means for normalizing said feature Matrix into a normalized feature Matrix;

means for partitioning said normalized feature Matrix into bricks;

means for prioritizing said bricks, and means for creating a feature template vector whose elements correspond to a subset of said bricks;

fourth means for forming feature vectors of the magnitudes of said most distinctive aspects of said image information;

fifth means for storing said feature vectors, said fifth means including neural network processor means adapted to store said feature vectors;

sixth means for receiving a query image from each of a predetermined number of potentially authorized persons, said predetermined number being two or more;

seventh means for applying said two or more query images received by said sixth means to said fourth means to form feature vectors corresponding to said two or more query images;

eighth means for querying said fifth means to determine whether said two or more query images are within a predetermined range of similarity to any of the images of said plurality of authorized persons;

ninth means, responsive to said eighth means, for outputting a signal indicative of whether all of said two or more potentially authorized persons are authorized persons.

6. A pattern recognition system, comprising:

first means for receiving a plurality of target images and corresponding target image identification information;

second means for processing said plurality of target images into image information;

third means for determining the most distinctive aspects of said image information, said third means including means for performing an In-Class to Out-of-Class study including:

means for generating an In-Class Variation Matrix;

means for generating an Out-Class Variation Matrix;

means for normalizing said In-Class Variation Matrix;

means for normalizing said Out-Class Variation Matrix;

means for generating a feature Matrix;

means for normalizing said feature Matrix into a normalized feature Matrix;

means for partitioning said normalized feature Matrix into bricks;

means for prioritizing said bricks, and means for creating a feature template vector whose elements correspond to a subset of said bricks;

fourth means for forming feature vectors of the magnitudes of said most distinctive aspects of said image information;

fifth means for storing said feature vectors, said fifth means including neural network processor means adapted to store said feature vectors;

sixth means for receiving a query image;

seventh means for generating a query feature vector from said query image;

eighth means for querying said fifth means to determine if any previously stored feature vectors are within a predetermined range of similarity to said query feature vector and for generating a signal indicative of such.

* * * * *

UNITED STATES PATENT AND TRADEMARK OFFICE
CERTIFICATE OF CORRECTION

PATENT NO. : 5,465,308

DATED : November 7, 1995

INVENTOR(S) : Timothy L. Hutcheson, Wilson Or, Venkatesh Narayanan, Subramaniam Mohan, Peter G. Wohlmut, Ramanujam Srinivasan, Bobby R. Hunt and Thomas W. Ryan It is certified that error appears in the above-indentified patent and that said Letters Patent is hereby corrected as shown below:

On the title page of the patent in the section entitled "Assignee:", replace "Datron/Transoc" with --Datron/Transco--.

On column 3, line 30, replace "images" with --image's--.

On column 5, line 13, replace "Speed" with --speed--.

On column 6, line 62, replace "760" with --755--."

On column 9, line 28, replace "MARDWARE" with --HARDWARE--.

On column 9, line 57, replace "PCAT" with --PC-AT--."

On column 10, line 9, replace "N- 100" with --N-100--.

On column 10, line 32, replace "interfere" with --interface--.

On column 11, line 45, replace "are" with --is--.

On column 11, line 60, replace "vectored" with --vector--.

On column 11, line 60, before "weight" insert --and--.

On column 11, line 61, replace "in" with --input--.

On column 11, line 66, replace "no" with --not--.

On column 12, line 2, replace "champed" with --changed--.

On column 12, line 3, replace "o" with --of--.

On column 14, line 5, replace "he" with --the--.

UNITED STATES PATENT AND TRADEMARK OFFICE
CERTIFICATE OF CORRECTION

PATENT NO. : 5,465,308
DATED : November 7, 1995
INVENTOR(S) : Timothy L. Hutcheson, Wilson Or, Venkatesh Narayanan, Subramaniam Mohan, Peter G. Wohlmut, Ramanujam Srinivasan, Bobby R. Hunt and Thomas W. Ryan It is certified that error appears in the above-indentified patent and that said Letters Patent is hereby corrected as shown below:

On column 14, line 26, replace "he" with --the--.

On column 14, line 41, replace "Nobutaki" with --Nobuyuki--.

On column 15, line 13, replace "re" with --are--.

On column 16, line 22, replace "MURAL" with --NEURAL--.

On column 17, line 6, replace "Vector-S00" with --Vector 800--.

On column 17, line 36, replace "The" with -- - The--.

On column 17, line 37, replace "the" with -- - the--.

On column 17, line 38, replace "the" with -- - the--.

On column 17, line 39, replace "set" with -- - set--.

On column 17, line 40, replace "the" with -- - the--.

On column 17, line 41, replace the first occurrence of "the" with -- - the--.

On column 17, line 42, replace the first occurrence of "the" with -- - the--.

On column 17, line 44, replace the first occurrence of "the" with -- - the--.

On column 17, line 44, replace "Standard" with --standard--.

On column 17, line 46, replace "and" with -- -and--.

On column 17, line 48, replace "ks" with --is--.

On column 17, line 48, delete the indent before the phrase "The content of ... a vector of".

UNITED STATES PATENT AND TRADEMARK OFFICE
CERTIFICATE OF CORRECTION

PATENT NO. : 5,465,308
DATED : November 7, 1995
INVENTOR(S) : Timothy L. Hutcheson, Wilson Or, Venkatesh Narayanan, Subramaniam Mohan, Peter G. Wohlmut, Ramanujam Srinivasan, Bobby R. Hunt and Thomas W. Ryan It is certified that error appears in the above-indentified patent and that said Letters Patent is hereby corrected as shown below:

On column 17, line 49, delete the indent before the phrase "floating point numbers ... each".

On column 17, line 50, delete the indent before the phrase "component of which ... output unit.".

On column 17, line 51, delete the indent before the phrase "In the Access Control ... outputs of".

On column 17, line 52, delete the indent before the phrase "the neural network ... the Identification".

On column 17, line 53, delete the indent before the phrase "Subsystem 810. This ... In applications".

On column 17, line 54, delete the indent before the phrase "requiring simple ranked output.".

On column 18, line 52, replace "A" with --$\Delta$--.

On column 18, line 64, replace "(e)" with --$(\alpha)$--.

On column 20, line 48, before "$\frac{-\partial \epsilon}{net_k}$" insert --$\therefore$--.

UNITED STATES PATENT AND TRADEMARK OFFICE
CERTIFICATE OF CORRECTION

PATENT NO. : 5,465,308
DATED : November 7, 1995
INVENTOR(S) : Timothy L. Hutcheson, Wilson Or, Venkatesh Narayanan, Subramaniam Mohan, Peter G. Wohlmut, Ramanujam Srinivasan, Bobby R. Hunt and Thomas W. Ryan It is certified that error appears in the above-indentified patent and that said Letters Patent is hereby corrected as shown below:

On column 20, line 59, replace "not" with --not--.

On column 21, line 50, replace "Ohd pj" with --$O_{pj}$--.

On column 21, line 59, replace "9®" with --9°--.

On column 22, line 57, replace "t" with --=--.

On column 23, line 8, replace "t" with --=--.

On column 23, line 9, after "ference" insert --.-- .

On column 24, line 26, replace "i" with --is--.

On column 25, line 33, replace "he" with --the--.

On column 25, line 47, replace "he" with --the--.

On column 25, line 53, after "to" insert --that--.

On column 25, line 58, after "quadrant" insert "(".

On column 28, line 6, delete "drivers" and insert --drivers'--.

On column 30, line 15, delete "$F_m(j)=F_m(0)+d_k(j)$" and insert
--$\Delta$
  $F_m(j) = F_m(0) + d_k(j)$ --.

On column 30, line 20, delete "$F_m(j)$" and insert --$\Delta$
                                                     $F_m(j)$ --.

UNITED STATES PATENT AND TRADEMARK OFFICE
CERTIFICATE OF CORRECTION

PATENT NO. : 5,465,308
DATED : November 7, 1995
INVENTOR(S) : Timothy L. Hutcheson, Wilson Or, Venkatesh Narayanan, Subramaniam Mohan, Peter G. Wohlmut, Ramanujam Srinivasan, Bobby R. Hunt and Thomas W. Ryan It is certified that error appears in the above-indentified patent and that said Letters Patent is hereby corrected as shown below:

On column 30, line 39, delete "$iv_m F_m(0)+\alpha d_k(j)$" and insert --$v_m = F_m(0) + \alpha d_k(j)$--.

On column 30, line 39, "(41)" should be indented to the right hand side of column 30.

On column 30, line 46, replace "e" with --$\alpha$--.

Signed and Sealed this

Fifteenth Day of April, 1997

*Attest:*

BRUCE LEHMAN

*Attesting Officer*　　*Commissioner of Patents and Trademarks*